(12) United States Patent
Hara

(10) Patent No.: US 8,731,395 B2
(45) Date of Patent: May 20, 2014

(54) FINDER UNIT, IMAGE CAPTURING APPARATUS, AND COMPUTER READABLE MEDIUM

(75) Inventor: Shinya Hara, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/555,571

(22) Filed: Jul. 23, 2012

(65) Prior Publication Data

US 2013/0045001 A1 Feb. 21, 2013

(30) Foreign Application Priority Data

Aug. 15, 2011 (JP) ................................. 2011-177524
May 24, 2012 (JP) ................................. 2012-118259

(51) Int. Cl.
*G03B 17/20* (2006.01)

(52) U.S. Cl.
USPC ......................................................... 396/296

(58) Field of Classification Search
USPC ......................................... 396/296, 378, 380
See application file for complete search history.

(56) References Cited

U.S. PATENT DOCUMENTS 6,097,900 A * 8/2000 Haraguchi ..................... 396/287
6,240,257 B1 * 5/2001 Nishizawa et al. ............ 396/287

FOREIGN PATENT DOCUMENTS

| JP | A-11-249203 | 9/1999 |
|----|-------------|--------|
| JP | A-2000-162695 | 6/2000 |
| JP | A-2000-171860 | 6/2000 |
| JP | A-2010-187265 | 8/2010 |
| JP | A-2010-212827 | 9/2010 |
| JP | A-2011-82740 | 4/2011 |

OTHER PUBLICATIONS

Notice of Reasons for Rejection dated Jul. 30, 2013 from Japanese Patent Application No. 2012-118259 (with partial English-language translation).

* cited by examiner

*Primary Examiner* — Clayton E Laballe
*Assistant Examiner* — Noam Reisner
(74) *Attorney, Agent, or Firm* — Oliff PLC

(57) ABSTRACT

Provided is a finder unit including: a transmission-type display section that displays information as overlaid on a subject image; and a display controller that, when an illuminating section illuminates the display section, changes a first display state to a second display state, where in the first display state, a first region which is at least a part of an outer region of an effective image capturing range is displayed so that a transmission ratio of the subject image in the first region is lowered, and in the second display state, a second region which is a part of the outer region and is smaller in area than the first region is displayed so that a transmission ratio of the subject image in the second region is lowered.

18 Claims, 12 Drawing Sheets

FINDER UNIT, IMAGE CAPTURING APPARATUS, AND COMPUTER READABLE MEDIUM

The contents of the following Japanese patent application are incorporated herein by reference:
  No. 2011-177524 filed on Aug. 15, 2011, and
  No. 2012-118259 filed on May 24, 2012

BACKGROUND

1. Technical Field

The present invention relates to a finder unit, an image capturing apparatus, and a computer readable medium.

2. Related Art

Such cameras have been already known, which have an optical finder provided with, in the vicinity of the image forming surface, a transmission-type display apparatus adopting a polymer-dispersed liquid crystal that can switch between transmission and dispersion of light, and overlaying an AF area onto a subject optical image by bringing, to the dispersion state, the display segment corresponding to the AF area.

PRIOR ART DOCUMENT

Patent Document

[Patent Document No. 1] Japanese Patent Application Publication No. 2000-162695

SUMMARY

In some cases, a part of the effective pixel region of an image capturing element is set as an image capturing range. In this case, if the illumination light is introduced into the transmission-type display apparatus after overlaying, onto the subject optical image, the entire outer region of the image capturing range together with the focused area, not only the focused area but also the entire outer region of the image capturing range will also emit light. If this happens, the illumination light onto the outer region having a relatively larger area will be dominant, thereby noticeably undermining the visibility.

According to a first aspect related to the innovations herein, provided is a finder unit including: a transmission-type display section that displays information as overlaid on a subject image; and a display controller that, when an illuminating section illuminates the display section, changes a first display state to a second display state, where in the first display state, a first region which is at least a part of an outer region or an effective image capturing range is displayed so that a transmission ratio of the subject image in the first region is lowered, and in the second display state, a second region which is a part of the outer region and is smaller in area than the first region is displayed so that a transmission ratio of the subject image in the second region is lowered.

According to a second aspect related to the innovations herein, provided is an image capturing apparatus including the aforementioned finder unit.

According to a third aspect related to the innovations herein, provided is a computer readable medium storing therein a display control program of a finder unit including a transmission-type display section for displaying information as overlaid on a subject image, the display control program causing a computer to execute display change to change a first display state to a second display state when an illuminating section illuminates the display section, where in the first display state, a first region which is at least a part of an outer region of an effective image capturing range is displayed so that a transmission ratio of the subject image in the first-region is lowered, and in the second display state, a second region which is a part of the outer region and is smaller in area than the first region is displayed so that a transmission ratio of the subject image in the second region is lowered.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
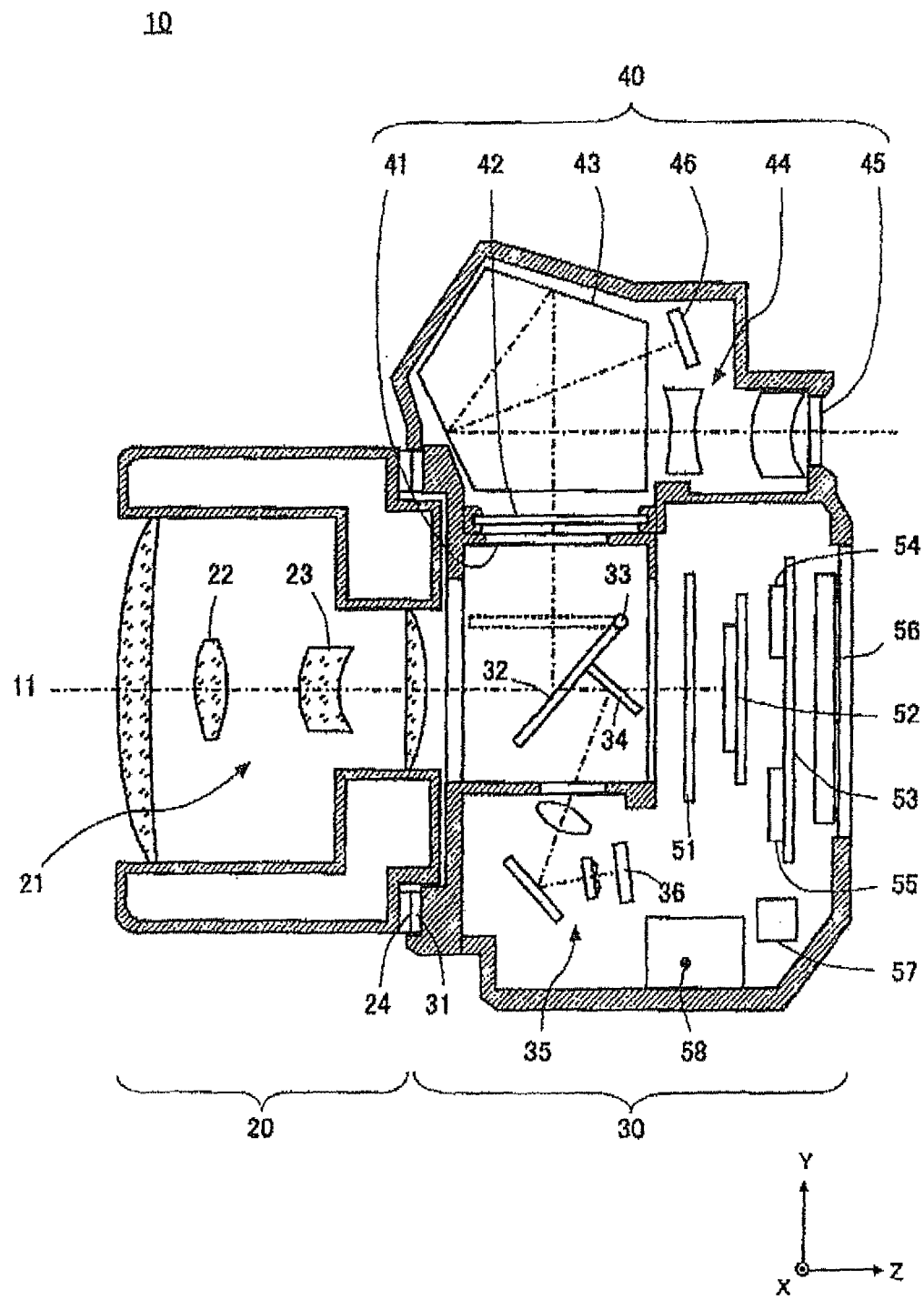
FIG. 1 is a sectional view of the important part of a single-lens reflex camera according to the present embodiment.

FIG. 1 is a sectional view of the important part of a single-lens reflex camera according to the present embodiment. The single-lens reflex camera 10 is composed of a lens unit 20 and a camera body 30, to function as an image capturing apparatus. A finder unit 40 is incorporated into the camera body 30.

The lens unit 20 includes a group of lenses 21 aligned along an optical axis 11. The group of lenses 21 introduces an incident subject light flux onto the camera body 30. The group of lenses 21 includes a focus lens 23, a zoom lens 22, or the like, and is configured to move in the optical axis direction according to such an instruction as focus adjustment, field angle adjustment. The lens unit 20 includes a lens mount 24 at the junction with the camera body 30, which is engaged with the camera mount 31 of the camera body 30, to be combined with the camera body 30.

The camera body 30 includes a main mirror 32 that reflects the subject light flux incident from the lens unit 20. The main mirror 32 turns around the rotation axis 33, and can take an oblique state in which the main mirror 32 is obliquely arranged in the subject light flux with the optical axis 11 in its center, and a retreat state in which the main mirror 32 has retreated from the subject light flux. For introducing the subject image towards the finder unit 40, the main mirror 32 takes the oblique state. For introducing the subject image towards the image capturing element 52, the main mirror 32 takes the retreat state.

The finder unit 40 includes a focusing screen 41, a transmission-type display panel 42, a pentaprism 43, an eyepiece optical system 44, a finder window 45, and a light measuring sensor 46. The focusing screen 41 is provided at a position conjugate with the light-receiving surface of the image capturing element 52. The optical image of the subject obtained from a primary image on the focusing screen 41 is converted into an erected image by means of the pentaprism 43 after being transmitted through the transmission-type display panel 42. Then, the subject optical image having been converted into the erected image will be observed by a user via the eyepiece optical system 44 and the finder window 45. The light-measuring sensor 46 provided in the upper side of the light emission surface of the pentaprism 43 detects the brightness of the subject from the subject optical image from the pentaprism 43.

The transmission-type display panel 42, which is a transmission-type display section is provided between the focusing screen 41 and the pentaprism 43, i.e., in the vicinity of the primary image forming surface of the subject light flux. An example of the transmission-type display panel 42 is a polymer-dispersed liquid crystal (PN liquid crystal). In the present embodiment, the transmission-type display panel 42 is provided in the upper surface side of the focusing screen 41. However, the transmission-type display panel 42 may be provided somewhere else such as in the lower surface side of the focusing screen 41, as long as it is provided in the vicinity of the primary image forming surface.

The transmission-type display panel 42 transmits the subject optical image in the state in which information is not to be displayed. On the other hand, in the state in which information is to be displayed, the transmission-type display panel 42 displays information by overlaying the information onto the subject optical image formed on the focusing screen 41. For example, the liquid crystal of the segment provided in correspondence with the focus detection region is brought into the diffused state, whereas a specific display pattern is overlaid onto the subject optical image to be visible. Concretely, a display pattern as information is overlaid onto the subject optical image, and is guided towards a user via the pentaprism 43. Other than the focus detection region, the information to be displayed includes an outer region of the effective image capturing range, the circumference frame region, which is a part of the outer region and includes the circumference of the effective image capturing range, a level indicator which functions as a horizontal/vertical indicator, which will be detailed later.

The vicinity of the optical axis 11 of the main mirror 32 in the oblique state is formed as a half mirror, through which a part of the incident subject light flux transmits. The transmitted subject light flux is reflected by a sub-mirror 34 turning in collaboration with the main mirror 32, to be guided towards the AF optical system 35. The subject light flux is incident onto the AF sensor 36, after having transmitted through the AF optical system 35.

An example of the AF sensor 36 is a plurality of photoelectric conversion element arrays outputting a phase difference signal from the received subject light flux. Concretely, the AF sensor 36 can detect a focused state, a front focus state, a rear focus state, in each of a plurality of focus adjusting regions provided in correspondence with specific regions of an optical image. In the front focus state and the rear focus state, the AF sensor 36 can also detect the amount of departure from the focused state. Note that when the main mirror 32 retreats from the subject light flux, the sub-mirror 34 also retreats from the subject light flux in collaboration with the main mirror 32.

In the rear side of the main mirror 32 in the oblique state, the focal plane shutter 51 and the image capturing element 52 are aligned along the optical axis 11. The focal plane shutter 51 is open for guiding the subject light flux towards the image capturing element 52, and is closed in other occasions. The image capturing element 52 is a photoelectric converting element such as CCD, CMOS sensors, and converts an optical image of a subject on the light receiving surface, into an electric signal.

The electric signal obtained by photoelectric conversion by the image capturing element 52 is processed into image data by means of an image processing section 54 (DSP) mounted on a main substrate 53. The main substrate 53 is provided with a camera system controller 55 (MPU) that integrally controls the system of the camera body 30, in addition to the image processing section 54. The camera system controller 55 performs input/output processing of each constituting element or the like, in addition to managing a camera sequence.

The backside display section 56 realized by a liquid crystal monitor or the like is provided at the back of the camera body 30, to display a subject image resulting from processing by the image processing section 54 on the main substrate 53. The backside display section 56 displays, not limited to the still image obtained by the image capturing, an EVF image as a viewfinder, various types of menu information, image capturing information, or the like.

An inclination sensor 57 detects an angle of inclination of the camera body 30. An example of the inclination sensor 57 is a three-axis acceleration sensor. The camera body 30 accommodates therein a removable secondary battery 58, and supplies power not only to the camera body 30 but also to the lens unit 20.

Figure 2:
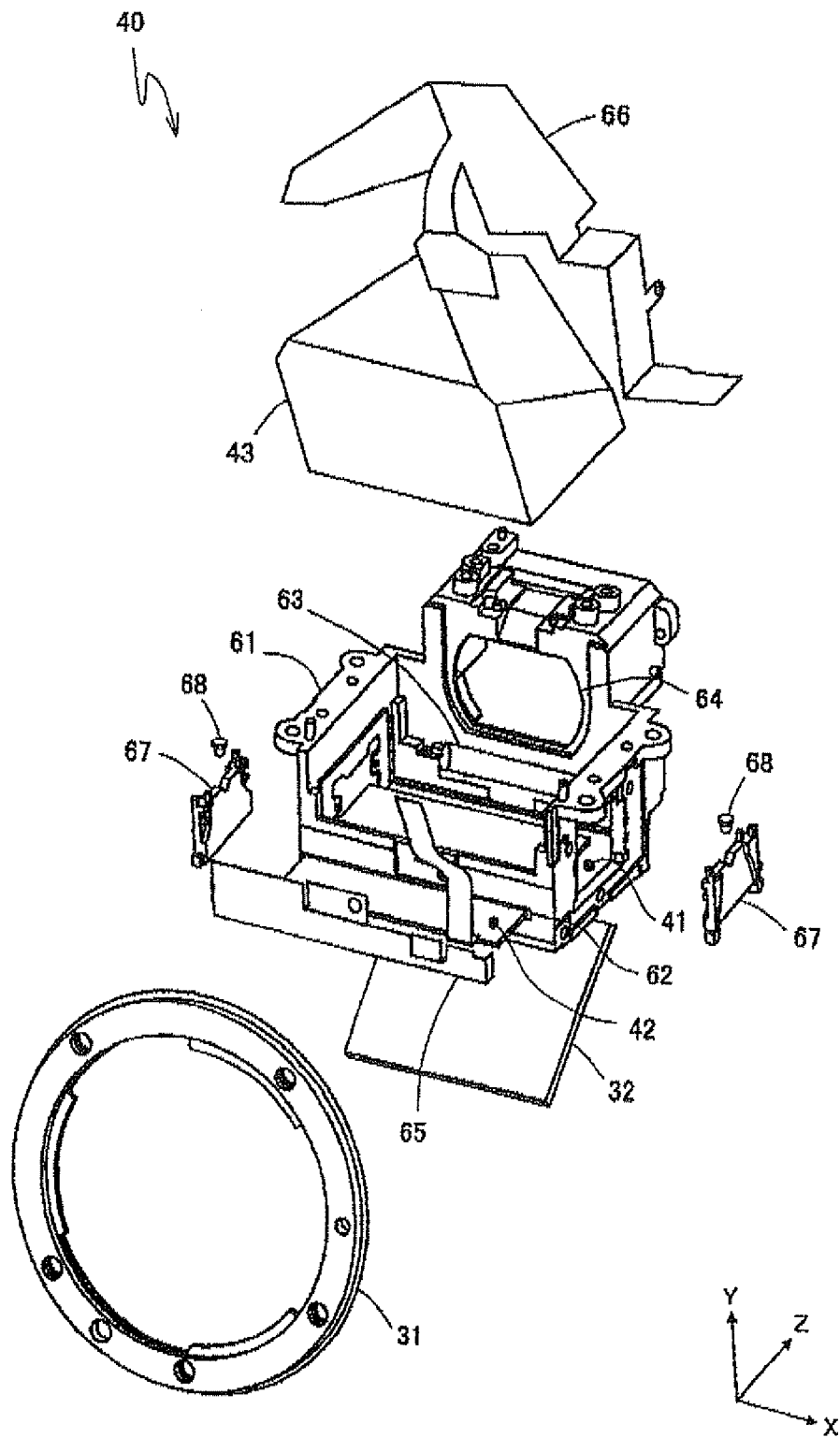
FIG. 2 is an exploded perspective diagram of components constituting a finder unit according to the present embodiment.

FIG. 2 is an exploded perspective diagram of components constituting a finder unit 40 according to the present embodiment. The finder unit 40 includes, other than the components shown in FIG. 1, a pentabox 61, a closure plate 65, a penta substrate 66, a light guide 67, and an LED 68. Note that FIG. 2 does not show the eyepiece optical system 44, the finder window 45, and the light measuring sensor 46. Also note that FIG. 2 shows a camera mount 31 and a main mirror 32, other than the finder unit 40, so as to clarify the positional relation among components constituting the finder unit 40 in the camera body 30.

The pentabox 61 is a supporting member that accommodates and supports the pentaprism 43. The pentabox 61 itself is fixed to a front plate of the camera body 30. As shown in FIG. 2, the pentabox 61 includes an incident opening 63 for causing a subject light flux to be incident onto the pentaprism 43 and an emission opening 64 for guiding the subject light flux emitted from the pentaprism 43 towards a user.

The transmission-type display panel 42 is inserted and incorporated into the hole 62 provided on one of the side surfaces of the pentabox 61 thereby being supported by the pentabox 61, the side surface of the pentabox 61 facing towards the subject light flux to be received by the main mirror 32. By doing so, the closure plate 65 closes the hole 62 to which the transmission-type display panel 42 has been inserted, so as to prevent any stray light or dust from entering the pentabox 61 from the gap created between the hole 62 and the transmission-type display panel 42.

The penta substrate 66 is provided adjacent to the upper surface of the pentaprism 43 which is opposite to the surface supported by the pentabox 61 (i.e., the incident surface opposing the focusing screen 41). Various circuits are integrated onto the penta substrate 66. The transmission-type display panel 42 is electrically connected to the penta substrate 66.

The light guide 67 is provided at the side surface orthogonal to both surfaces respectively provided with the incident opening 63 and the emission opening 64. The light guide 67 causes the illumination light from the LED 68 as an illuminating section, to be incident to the side surface of the transmission-type display panel 42. The illumination light having been incident onto the transmission-type display panel 42 is diffused in the liquid crystal region in the diffused state, to be visible to a user.

The diffused state of a particular liquid crystal region of the transmission-type display panel 42 is referred to as "on-state" of the particular display region, and the non-diffused state of a particular liquid crystal region of the transmission-type display panel 42 is refereed to as "off-state" of the particular display region. In addition, setting a particular liquid crystal region of the transmission-type display panel 42 to a diffused state is referred to as "bringing the particular display region to be ON" and setting a particular liquid crystal region of the transmission-type display panel 42 to a non-diffused state is refereed to as "bringing the particular display region to be OFF."

Figure 3:
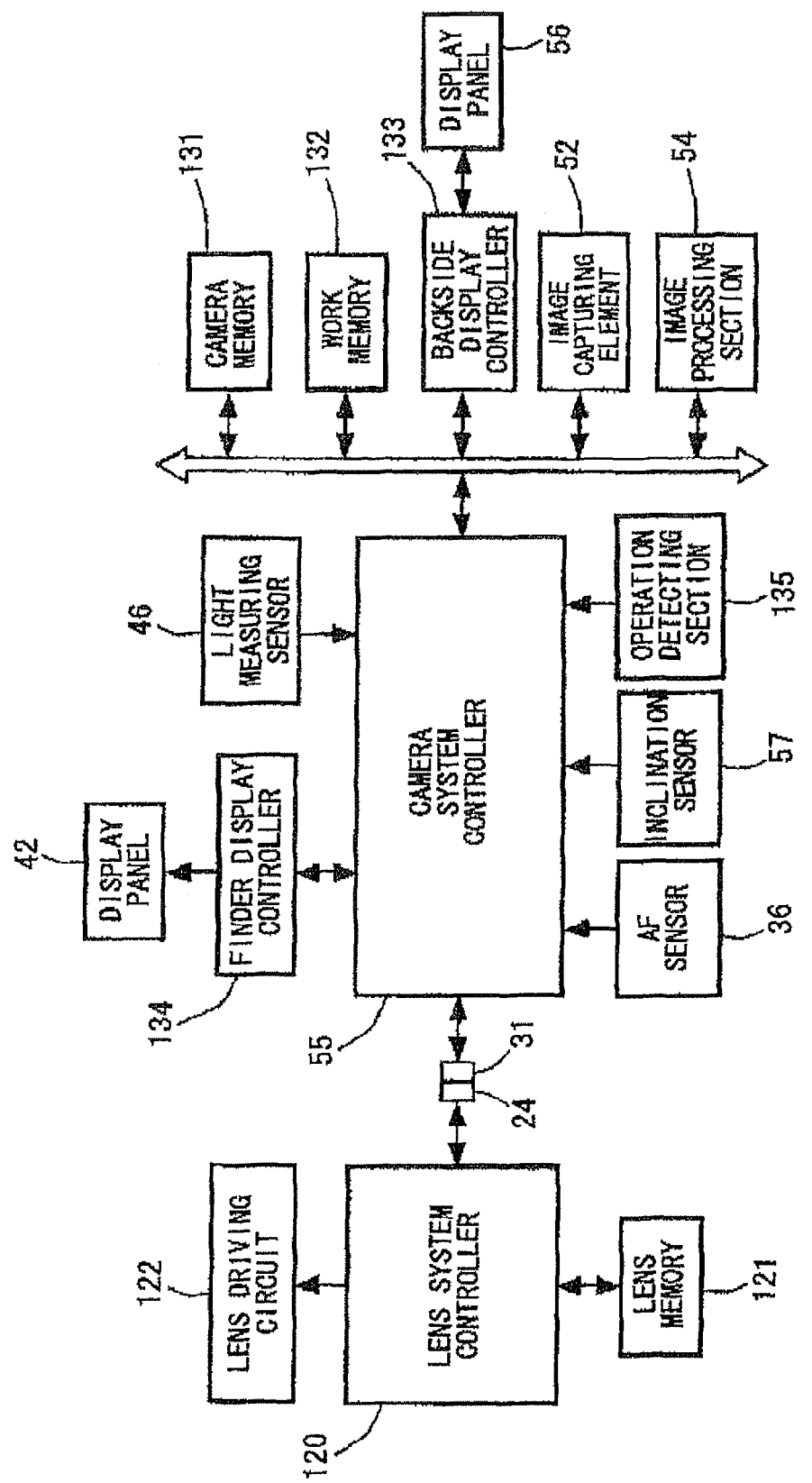
FIG. 3 is a-block diagram schematically showing the system configuration of the single-lens reflex camera according to the present embodiment.

FIG. 3 is a block diagram schematically showing the system configuration of the single-lens reflex camera 10 according to the present embodiment. The single-lens reflex camera 10 is configured by a lens control system having a lens system controller 120 at its center and a camera control system having a camera system controller 55 at its center, respectively corresponding to the lens unit 20 and the camera body 30. The lens control system and the camera control system mutually exchange various types of data, control signals, via a connecting section connected via the lens mount 24 and the camera mount 31.

The lens control system includes a lens memory 121 and a motor driving circuit 122. The lens memory 121 is a nonvolatile memory operable of deleting and recording electrically, and is configured by EEPROM (registered trademark) for example. The lens memory 121 records constants, variables, programs, or the like necessary for operation of the lens unit 20, to prevent them from being lost even when the lens unit 20 is not operating. The lens system controller 120 controls, via a motor driving circuit 122, a motor for moving the zoom lens 22 and a motor for moving the focus lens 23.

In accordance with an instruction from the camera system controller 55, the image processing section 54 included in the camera control system processes an image capturing signal having been photoelectric converted by the image capturing element 52 into image data in accordance with a standardized image format. For example, for generating a JPEG file as a still image, after image processing such as color conversion, gamma processing, white balancing, or the like is performed, compression processing is performed by means of adaptive discrete cosine transform or the like. For generating an MPEG file as a moving image, compression processing is performed by applying intraframe coding, interframe coding onto frame images, which are sequential still images having a predetermined smaller number of pixels.

In the present embodiment, two pixel ranges are determined in advance, as image capturing ranges, which are pixel ranges to be captured among a group of pixels of the image capturing element 52. The first range is a pixel range of effective pixel regions of the image capturing element 52. In the present embodiment, the pixel range of effective pixel regions of the image capturing element 52 is 36 mm×24 mm whose diagonal line measures at about 43 mm, which is about the same size as a 35 mm film. This pixel range of effective pixel regions is referred to as "FX size." The second image capturing range corresponds to a pixel range of 24 mm×16 mm whose diagonal line measures at about 29 mm, which is about the same size as C size of an APS film smaller than the FX size. This pixel range is referred to as "DX size."

A user can select one of the FX size and the DX size, as an image capturing range. When the FX size is selected, the image capturing element 52 photoelectric-converts the subject image in the entire effective pixel region, and the image processing section 54 generates image data corresponding to this entire effective pixel region.

When the DX size is selected, the image capturing element 52 outputs the subject image of the region corresponding to the DX size, from among the effective pixel region, and the image processing section 54 generates image data corresponding to the region corresponding to the DX size. Alternatively, it can also be arranged so that the image capturing element 52 outputs the subject image of the entire effective pixel region, and the image processing section 54 crops the image data of the region corresponding to the DX size from among the effective pixel region.

The camera memory 131 is a nonvolatile memory operable of deleting and recording electrically, and is configured by EEPROM (registered trademark) for example. The camera memory 131 records constants, variables, programs, or the like necessary for operation of the single-lens reflex camera 10, to prevent them from being lost even when the single-lens reflex camera 10 is not operating. For example, the work memory 132 may be a memory (e.g., RAM) enabling high-speed access, and can perform various functions such as temporarily storing image data under processing.

A backside display controller 133 performs display control so as to display various types of information on the backside display section 56, in accordance with an instruction from the camera system controller 55. For example, the backside display controller 133 may display, on the backside display section 56, the captured image display data generated by the image processing section 54, the menu items stored in the camera memory 131.

The finder display controller 134 performs display control so as to display various types of information on the transmission-type display panel 42, in accordance with an instruction from the camera system controller 55. For example, the finder display controller 134 displays, on the transmission-type display panel 42, a focus detection region, an outer region of an effective image capturing range, an circumference frame region of the effective image capturing range, and a level indicator which functions as a horizontal/vertical indicator. In the present embodiment, the finder display controller 134 is mounted on the penta substrate 66 of the finder unit 40.

The operation detecting section 135 detects operation of an operation member such as a ten key, a decision key, or the like provided on the camera body 30, and outputs the detection result to the camera system controller 55. The operation member includes a release switch constituted by a push button enabling two-step detection in the pushed direction. The camera system controller 55 detects an occasion that the release switch has been pushed down to the first step (i.e. switching ON of SW1), thereby performing AF control, AE control, or the like, to prepare for image capturing. The camera system controller 55 detects an occasion that the release switch has been pushed further down to the second step (i.e. switching ON of SW2), thereby performing an acquiring operation of the subject image by means of the image capturing element 52.

The light measuring sensor 46 detects the brightness of the subject from the subject optical image, and outputs the measured light data to the camera system controller 55. The camera system controller 55 calculates the exposure value by analyzing the measured light data of the light measuring sensor 46.

The AF sensor 36 outputs a phase difference signal to the camera system controller 55. The camera system controller 55 performs AF control in accordance with the output from the AF sensor 36, in collaboration with the lens system controller 120 and the motor driving circuit 122. The camera system controller 55 calculates the driving amount of the focus lens 23, from the phase difference signal of the AF sensor 36. Then, the camera system controller 55 outputs, to the lens system controller 120, the driving control signal representing the driving amount of the focus lens 23.

The camera system controller 55 performs single AF control, which is to lock the AF at the time when it is focused during the ON period of SW1 of the release button. The camera system controller 55 can also perform continuous AF control for continuing to focus on the motion of the subject during the ON period of SW1 of the release button. A user can select either the single AF control or the continuous AF control by operating the operation member.

The inclination sensor 57 detects the angle of inclination of the camera body 30, and outputs the data on the angle of inclination to the camera system controller 55. The camera system controller 55 calculates the posture of the camera body 30 from the data on inclination obtained from the inclination sensor 57.

Figure 4A:
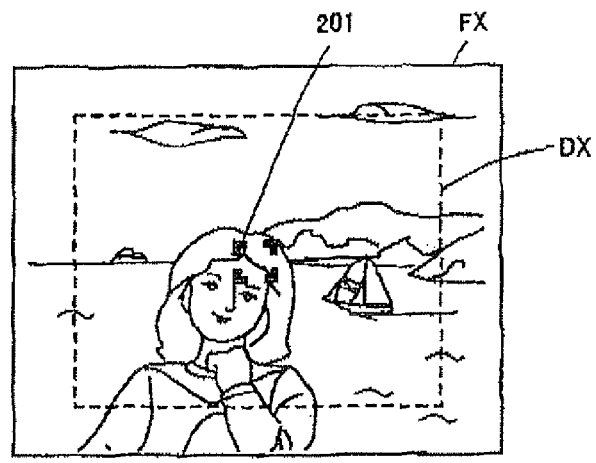
FIG. 4A, FIG. 4B, and FIG. 4C explain display control processing of a transmission-type display panel.
Figure 4B:
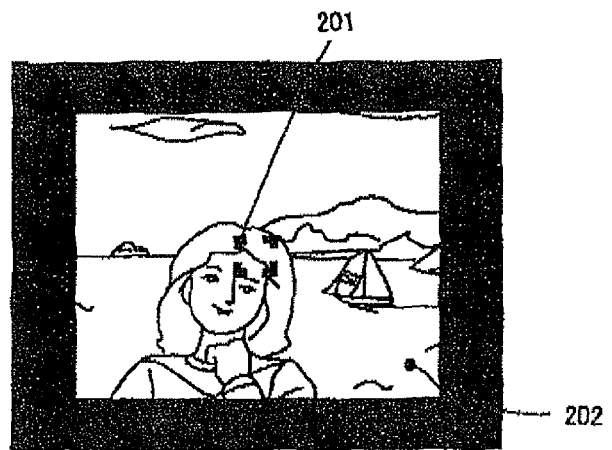
Figure 4C:
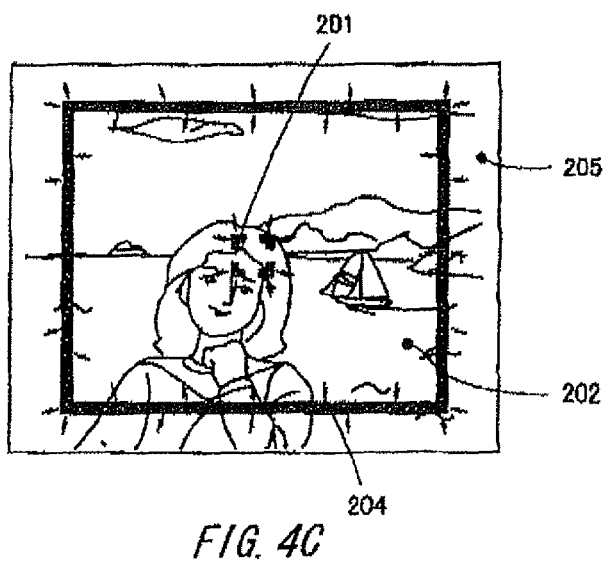

FIG. 4A, FIG. 4B, and FIG. 4C explain display control processing of a transmission-type display panel 42. FIG. 4A shows an exemplary display of the subject optical image observed through the finder window 45 when the FX size has been selected as the image capturing range. When the finder unit 40 has a 100% finder coverage, the range of the subject optical image of the FX size will be equal to the range of the subject optical image observed through the finder window 45.

When the AF control of the camera system controller 55 has been completed, the finder display controller 134 switches ON the display region corresponding to a focus detection region 201 representing the region focused on by the AF control. As shown in FIG. 4A, in the display region switched ON in the transmission-type display panel 42, the transmission ratio of the subject optical image in the focus detection region 201 will be lowered, and so the focus detection region 201 is recognized darker than the subject optical image of the other regions. By such a configuration, a user can easily grasp the focused region.

Also when the DX size has been selected as the image capturing range, the range of the subject optical image observed through the finder window 45 will be in accordance with the finder coverage with reference to the FX size. With this in view, the finder display controller 134 controls the transmission-type display panel 42 so that the subject optical image observed through the finder window 45 can be discerned between the subject optical image of the DX size and the other types of subject optical images.

FIG. 4B shows the first display example of the subject display image observed through the finder window 45 when the DX size has been selected as the image capturing range. The finder display controller 134 switches ON the display region corresponding to the entire outer region 203 of the effective image capturing range 202 (i.e. the range of the subject optical image of the DX size). The transmission ratio of the subject optical image in the entire outer region 203 is lowered, thereby making a user recognize the outer region 203 darker than the subject optical image in the effective image capturing range 202. This makes it easier for the user to recognize the image capturing range of the DX size. In the present embodiment, the state in which the display region corresponding to the entire outer region 203 is switched ON so as to lower the transmission ratio of the subject optical image of the entire outer region 203 is referred to as "first display state."

In addition, just as in FIG. 4A, the finder display controller 134 switches ON the display region corresponding to the focus detection region 201 representing the region focused on by the AF control, when the AF control of the camera system controller 55 has been completed. Then, as shown in FIG. 4B, the transmission ratio of the subject optical image in focus detection section 201 is lowered, thereby making a user recognize the focus detection region 201 darker than the subject optical image in the other effective image capturing range 202. This makes it easier for the user to recognize the focused region.

In some occasions such as when the SW1 of the release switch is brought ON, it is desirable to cause the transmission-type display panel 42 to illuminate by the LED 68, thereby to illuminate the focus detection region 201. However, if the LED 68 illuminates the transmission-type display panel 42 while the display region corresponding to the entire outer region 203 is ON, not only the focus detection region 201 but also the entire outer region 203 will emit light. This will lead to noticeable reduction in visibility, because the illumination light onto the outer region 203 having a relatively larger area becomes dominant. Also as mentioned above, the illumination light of the LED 68 is guided using the light guide 67 from the side surface of the transmission-type display panel 42 to be diffused through the entire transmission-type display panel 42. Therefore, the illumination light from the LED 68 on the transmission-type display panel 42 will have an inconstant intensity distribution. This will cause an uneven illumination surface of the entire outer region 203, to deteriorate the dignity of the image observed through the finder window 45.

To alleviate this issue, when the LED 68 is used to illuminate the transmission-type display panel 42, the finder display controller 134 changes the display state of the transmission-type display panel 42 from the aforementioned first display state. The display state in a case in which the LED 68 illuminates the transmission-type display panel 42 is detailed as follows using FIG. 4C.

FIG. 4C shows the second display example of the subject display image observed through the finder window 45 when the DX size has been selected as the image capturing range. Instead of switching ON the entire outer region 203, the finder display controller 134 switches ON the display region corresponding to a part of the outer region 203 including the circumference of the effective image capturing range 202, which corresponds to the circumference frame region 204. The transmission ratio of the subject optical image in the circumference frame region 204 is lowered, thereby making a user recognize the circumference frame region 204 darker than the subject optical image in the effective imaging range 202.

On the other hand, the display region corresponding to the outside-frame region 205, which is the region of the outer region 203 excluding the circumference frame region 204 is set OFF. Therefore, the transmission ratio of the subject optical image in the outside-frame region 205 becomes equivalent to the transmission ratio of the subject optical image in the effective image capturing range 202. Note that after completion of the AF control of the camera system controller 55, the finder display controller 134 continues displaying the focus detection region 201 showing the region focused on by the AF control, even when the display state has been switched to another.

In this display state, when the LED 68 illuminates the transmission-type display panel 42, the focus detection region 201 and the circumference frame region 204 emit light. The difference between the area of the circumference frame region 204 and the area of the focus detection region 201 is smaller than the difference between the outer region 203 and the area of the focus detection region 201. Therefore, the difference between the illumination light of the circumference frame region 204 and the illumination light of the focus detection region 201 will also be smaller than the difference between the illumination light of the entire outer region 203 and the illumination light of the focus detection region 201, which proves improved visibility compared to illumination using the LED 68 in the first display state. Accordingly, a user will find it easier to confirm the focused position and the image capturing enabled range, than in the case of illumination using the LED 68 in the first display state.

Moreover, the illumination surface of the circumference frame region 204 will be less uneven than that of the outer region 203, which makes it easier for a user to confirm the image through the finder window 45 than in the case of illumination using the LED 68 in the first display state. Note that in the present embodiment, the state in which the display region corresponding to the circumference frame region 204 is switched ON so as to lower the transmission ratio of the subject optical image of the circumference frame region 204 is referred to as "second display state."

In addition to the subject optical image in the effective image capturing range 202, the subject optical image in the outside-frame region 205 is also recognized. if there is no light emission on the circumference frame region 204, which is sandwiched between the subject optical image in the effective image capturing range 202 and the subject optical image in the outside-frame region 205, it becomes harder to distinguish the circumference frame region 204 from others. Therefore, if the transmission-type display panel 42 is brought into the second display state while not illuminating the transmission-type display panel 42 by the LED 68, a user may misjudge the circumference of the outside-frame region 205 (i.e., the range of the subject optical image of the FX size) to be the image capturing enabled range.

So as to prevent such misjudgment, the finder display controller 134 sets the display state of the transmission-type display panel 42 to the first display state unless while the LED 68 is illuminating the transmission-type display panel 42. Then, when the LED 68 illuminates the transmission-type display panel 42, the finder display controller 134 changes the display state of the transmission-type display panel 42 to the second display state. In this way, by changing the display state of the transmission-type display panel 42 depending on whether the LED 68 is illuminating or not, a user can easily confirm the focused region and the image capturing enabled range in either case. Note that as shown in FIGS. 4B and 4C, the finder display controller 134 maintains the ON state of the display region corresponding to the focus detection region 201 regardless of whether the LED 68 is illuminating or not.

Figure 5A:
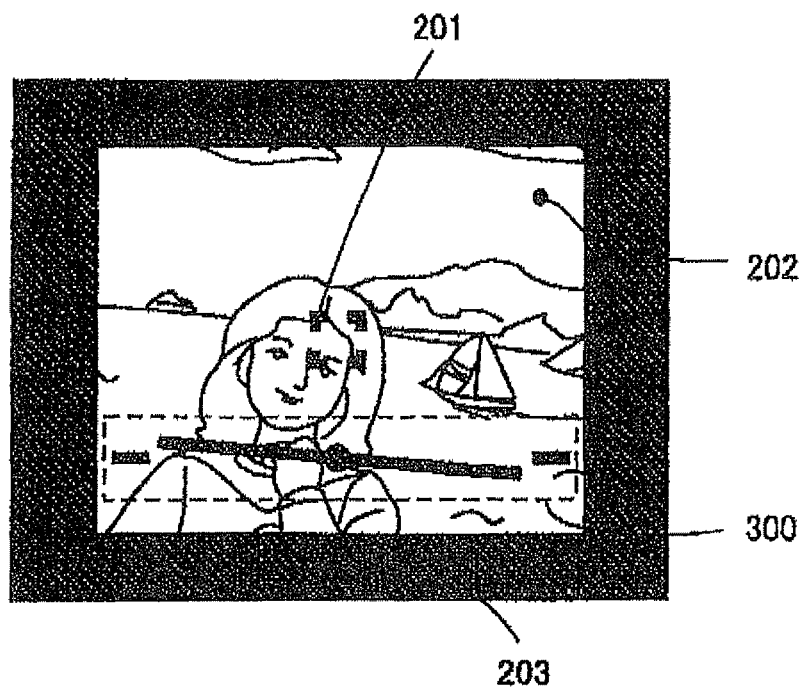
FIG. 5A and FIG. 5B explain a first modification example of the display control processing of the transmission-type display panel.
Figure 5B:
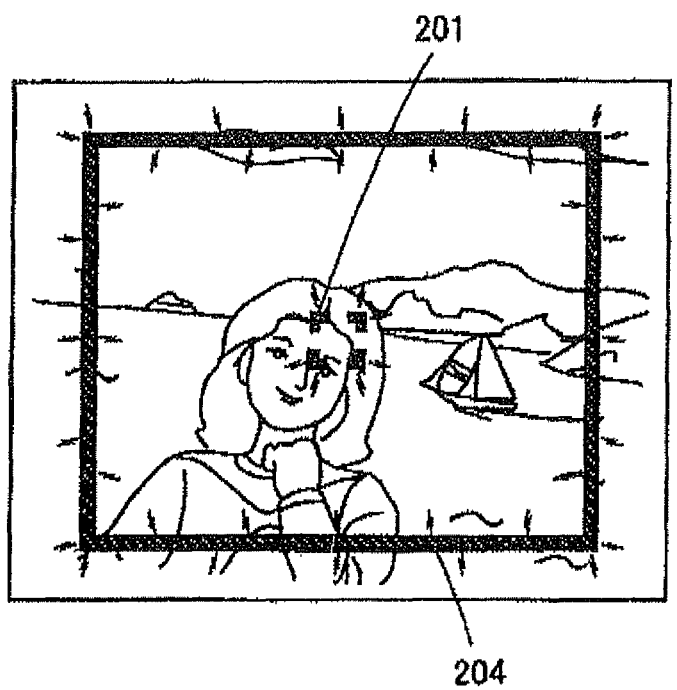

FIG. 5A and FIG. 5B explain a first modification example of the display control processing of the transmission-type display panel 42. In the display control processing of the first modification example, a level indicator, which represents a display pattern different from any of the aforementioned focus detection region, outer region, and circumference frame region is overlaid onto the subject optical image.

When the LED 68 is not performing illumination, the finder display controller 134 of the transmission-type display panel 42 switches ON the display region corresponding to the level indicator 300, together with the focus detection region 201 and the outer region 203, as shown in FIG. 5A. The level indicator 300 is a horizontal/vertical indicator, and indicates the inclination of the camera body 30 around the optical axis 11. The level indicator 300 is included in the effective image capturing range 202. The finder display controller 134 displays, onto the transmission-type display panel 42, the level indicator 300 corresponding to the posture of the camera body 30 which the camera system controller 55 has calculated from the data on inclination of the inclination sensor 57.

When the LED 68 performs illumination, the finder display controller 134 switches OFF the display region corresponding to the outer region 203 and the level indicator 300. Then, the finder display controller 134 switches the display region corresponding to the circumference frame region 204 together with the display region of the focus detection section 201, thereby switching to the display state of FIG. 5B. In this way, by blocking light emission of the level indicator 300, a user is able to confirm the focused region and the image capturing enabled range easily.

Note that in this first modification example, the level indicator was taken as an example of the display patterns other than the aforementioned focus detection region, outer region, and circumference frame region, however the present invention is not limited to this example. As different examples from this, the finder display controller 134 may also switches ON the display region corresponding to such display patterns as aperture value, shutter speed, and charge state of the secondary battery 58, which correspond to the exposure value calculated by the camera system controller 5, when the LED 68 does not conduct illumination, and when the LED 68 does conduct the illumination, the finder display controller 134 may switch OFF the display region corresponding to these display patterns.

Figure 6A:
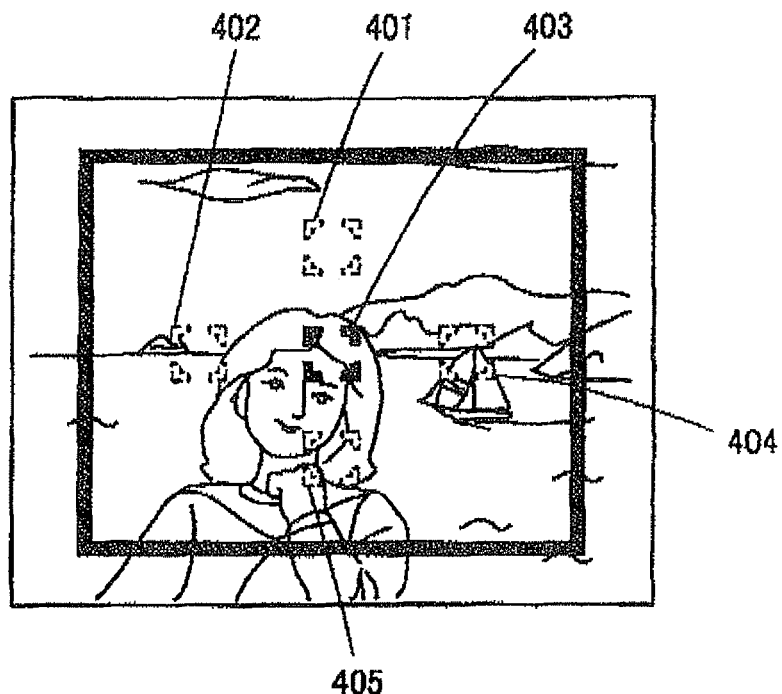
FIG. 6A and FIG. 6B explain a second modification example of the display control processing of the transmission-type display panel.
Figure 6B:
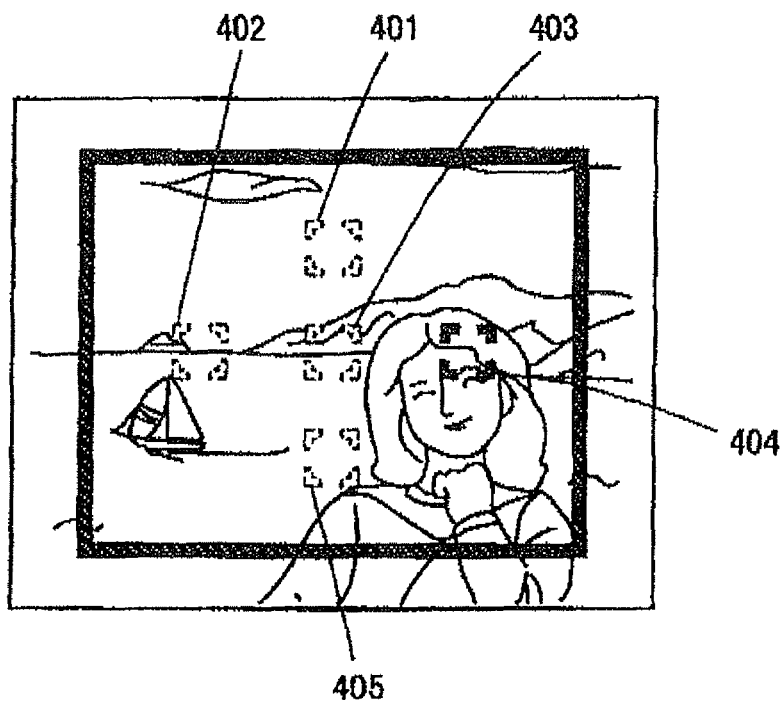

FIG. 6A and FIG. 6B explain a second modification example of the display control processing of the transmission-type display panel 42. The second modification example is directed to a display control processing performed by the transmission-type display panel 42 when the camera system controller 55 performs continuous AF control. When continuous AF is selected, the finder display controller 134 sets the display state of the transmission-type display panel 42 to the aforementioned second display state.

As shown in FIG. 5A and FIG. 5B, there are five focus detection regions in the present embodiment, i.e., the first focus detection region 401, the second focus detection region 402, the third focus detection region 403, the fourth focus detection region 404, and the fifth focus detection region 405. The finder display controller 134 sets ON only the display region corresponding to the focus detection region that has obtained focus, and switches OFF any other display regions corresponding to the other focus detection regions. In FIG.

5A, the finder display controller 134 sets ON only the display region corresponding to the third focus detection region 403.

In continuous AF control, the focus detection region to be focused on transitions as the subject moves. As the subject moves from the state shown in FIG. 5A to the state shown in FIG. 5B, the focus detection region to be focused on will transition from the third focus detection region to the fourth focus detection region. Therefore, as FIG. 5B shows, the finder display controller 134 transitions the display region to be ON in the transmission-type display panel 42, from the display region corresponding to the third focus detection region to the display region corresponding to the fourth focus detection region.

During continuous AF control, the camera system controller 55 may prohibit the illumination by the LED 68. Alternatively, the camera system controller 55 may control the LED to perform illumination to cause the focus detection region to emit light, during a period determined in advance (e.g., until 1 second has elapsed) ater focusing in a certain focus detection region.

If switching between the aforementioned first display state and second display state is performed depending on whether there is illumination by the LED 68, it may impair visibility to users because of frequent switching of the display depending on the transition of focusing detection regions to be focused. In order to avoid such an inconvenience, during continuous AF control, the finder display controller 134 fixes the display state of the transmission-type display panel 42 to the second display state regardless of whether the LED 68 is performing illumination or not.

Figure 7:
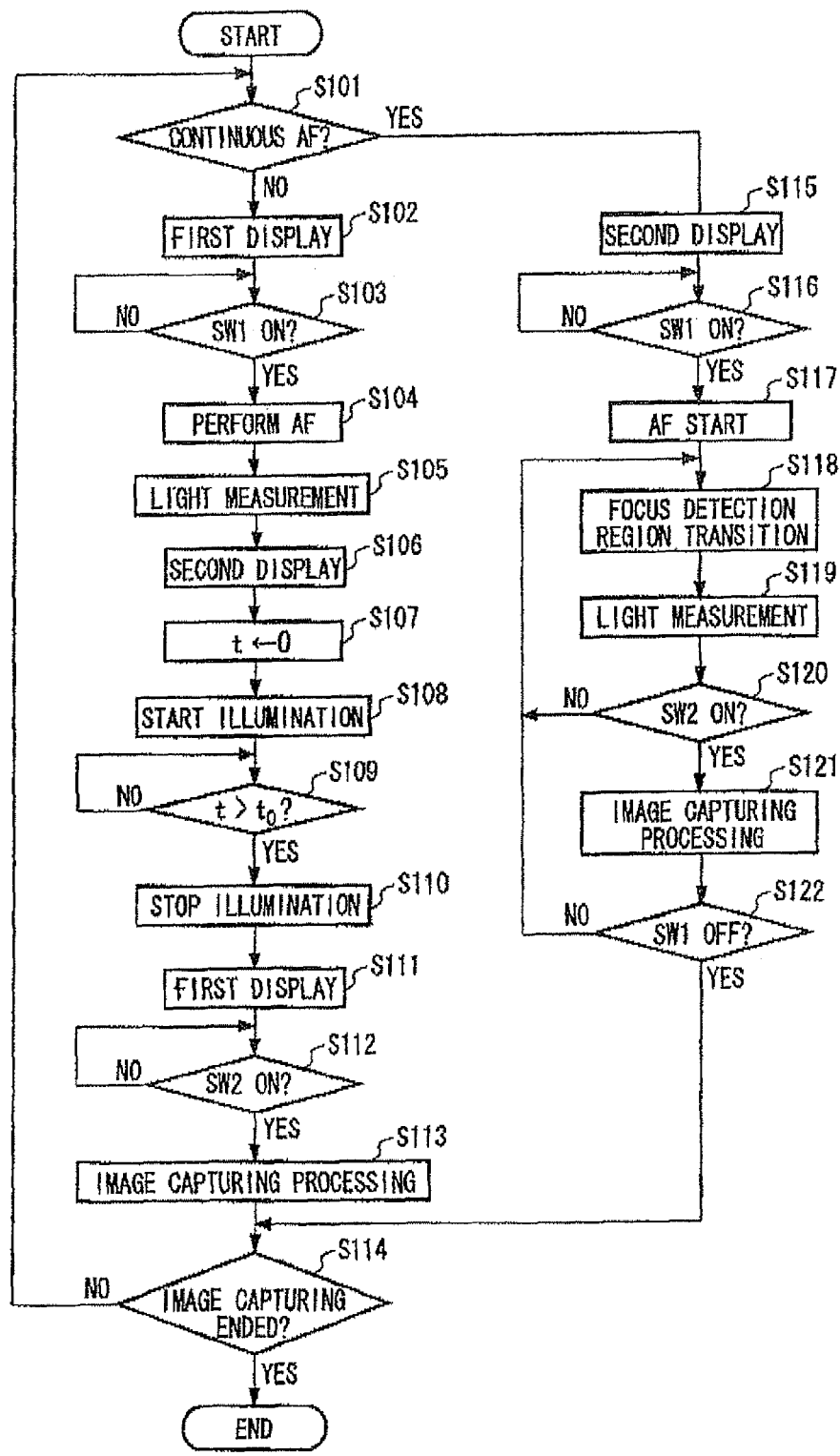
FIG. 7 is a flow diagram showing display control of the transmission-type display panel according to the present embodiment.

FIG. 7 is a flow diagram showing display control processing of the transmission-type display panel 42 according to the present embodiment. The processing of this flow is conducted when the DX size is selected as the image capturing range. This flow is for example started when the power source of the camera body 30 is turned ON. In the present embodiment, the finder display controller 134 performs the processing of the present flow, in collaboration with the camera system controller 55 or the like.

In Step S101, the camera system controller 55 judges whether continuous AF is selected or not. When single AF control has been selected, the control goes to Step S102, and when continuous AF has been selected, the control goes to Step S115.

In Step S102, the finder display controller 134 switches ON the display region corresponding to the entire outer region of the effective image capturing range, and sets the transmission-type display panel 42 to the first display state. In Step S103, the camera system controller 55 detects whether the SW1 of the release switch has been turned ON. The control waits at Step S103 until SW1 is turned on, and when SW1 is actually turned ON, it moves onto the processing of Step S104.

In Step S104, the camera system controller 55 conducts single AF control in response to a phase difference signal of the AF sensor, in collaboration with the lens system controller 120 and the motor driving circuit 122. After the single AF control has ended, the finder display controller 134 switches ON the display region corresponding to the focus detection region having obtained focus, together with the display region corresponding to the entire outer region.

In Step S105, the camera system controller 55 acquires the measured light data of the light measuring sensor 46, and determines the exposure value. Note that when the LED 68 is illuminated in Step S105, the brightness of the subject optical image reaching the light measuring sensor 46 will be affected by the illumination light of the LED 68, to be different from the brightness of the subject optical image at the focusing screen 41. To prevent such a phenomenon, the camera system controller 55 prohibits illumination by the LED 68 during the light measuring processing of Step S105.

In Step S106, the finder display controller 134 sets OFF the display region corresponding to the entire outer region. Then, the finder display controller 134 sets ON the display region corresponding to the circumference frame region 204 which is a part of the outer region including the circumference of the effective image capturing range, and changes the display state of the transmission-type display panel 42 to the second display state. Please note that the finder display controller 134 keeps the ON state of the display region corresponding to the focus detection region.

In Step S107, the camera system controller 55 starts measuring the time by setting the timer "t" to 0. In Step S108, the camera system controller 55 drives the LED 68 to illuminate the transmission-type display panel 42. The illumination light of the LED 68 will be incident to the transmission-type display panel 42 through the light guide 67, to cause the focus detection region and the circumference frame region to emit light. In step S109, the camera system controller 55 judges whether "t" has exceeded the time to (e.g., 1 second). The control waits at Step S109 until "t" exceeds time to, and when "t" has exceeded to, it moves onto the processing of Step S110.

In Step S110, the camera system controller 55 stops driving the LED 68, and stops illumination by the LED 68. In Step S11, the finder display controller 134 turns OFF the display region corresponding to the circumference frame region. Then, the finder display controller 134 turns ON the display region corresponding to the outer region, to return the display state of the transmission-type display panel 42 to the first display state. Please note that the finder display controller 134 keeps the ON state of the display region corresponding to the focus detection region.

In Step S112, the camera system controller 55 detects whether the SW2 of the release switch is turned ON. The control waits at Step as112 until SW2 is turned on, and when SW2 is actually detected to have been turned ON, it moves onto the processing of Step S113. Note that if the SW2 is not detected to be turned ON for a certain amount of time (e.g., within 5 seconds) after detecting switching ON of the SW1, the control will go on to the processing of Step S114.

In Step S113, the camera system controller 55 and the image processing section 54 perform image capturing processing. Specifically, the camera system controller 55 performs AF control in accordance with the exposure value determined in Step S105. The image processing section 54 converts the output of the image capturing element 52 to the image data of the standardized image format. In Step S114, the camera system controller 55 judges whether the operation of the image capturing ending (e.g., power OFF operation) has been conducted by a user. If there is no operation performed to end the image capturing, the control returns to Step S101, and when the image capturing ending operation is done, the present flow is ended.

When continuous AF is selected, the finder display controller 134 turns ON the display region corresponding to the circumference frame region which is a part of the outer region of the effective image capturing range including the circumference of the effective image capturing range, in Step S115, and sets the display state of the transmission-type display panel 42 to the second display state. In Step S116, the camera system controller 55 determines whether the SW1 of the release switch is turned ON. The control waits at Step as116 until the SW1 is turned on, and when SW1 is actually detected to be turned ON, it moves onto the processing of Step S117.

In Step S117, the camera system controller 55 starts continuous AF control, depending on the phase difference signal of the AF sensor 36. In Step S118, the finder display controller 134 transitions the display of the focus detection region to be focused on, in line with the movement of the subject. In Step S119, the camera system controller 55 acquires the measured light data detected by the light measuring sensor 46, and determines the exposure value based on the measured light data. In Step S120, the camera system controller 55 detects whether the SW2 of the release switch is turned ON. When SW2 is not ON, the control returns to Step S118, and when SW2 is turned ON, it moves onto the processing of Step S121.

In Step S121, the camera system controller 55 and the image processing section 54 perform the similar image capturing processing to the processing in Step S113. In step S122, the camera system controller 55 determines whether the SW1 of the release switch has been turned OFF. When the SW1 is kept ON, the control returns to Step S118, and when SW1 is turned OFF, it moves onto the processing of Step S114.

In the light measuring processing of the aforementioned Step S105 or Step S109, the accuracy in light measurement will be more enhanced as the brightness of the subject optical image reaching the light measuring sensor 46 approaches nearer the brightness of the subject optical image on the focusing screen 41. The display pattern overlaid in the transmission-type display panel 42 affects the brightness of the subject optical image reaching the light measuring sensor 46.

In view of this, the finder display controller 134 may change the display state of the transmission-type display panel 42 to the second display state in which the display pattern has a smaller area than in the first display state. In addition, in the light measuring processing of the aforementioned Step S105 or S119, the finder display controller 134 may turn OFF all the display regions of the transmission-type display panel 42. Note that after completion of the light measuring processing, the finder display controller 134 brings back the display state of the transmission-type display panel 42 to the state prior to the light measuring processing.

In the aforementioned Step S106 through S110, light emission to the focus detection region was always performed after switching to the second display state. However, when the image observed through the finder window 45 is bright enough, a user can grasp the focus detection region even without light emission on the focus detection region. In light of this, from Step S106 through Step S110, the finder display controller 134 may change the display state of the transmission-type display panel 42 to the second display state, by examining the result of the light measuring processing in Step S105.

The exemplary concrete processing is as follows. First, in Step S106, the camera system controller 55 determines the EV value from the exposure value calculated in Step S105. Then, the finder display controller 134 judges whether the EV value is no smaller than the threshold determined in advance. An exemplary threshold value is an EV value determined in advance either through experiments or simulations, at which a user can easily recognize the focus detection region in the first display state.

If the EV value is smaller than the threshold value, the finder display controller 134 changes the display state of the transmission-type display panel 42 to the second display state from the first display state. Then, in the aforementioned Step S107 through S110, the finder display controller 134 controls the focus detection region and the circumference frame region to emit light. On the other hand, if the E value is no smaller than the threshold value, the finder display controller 134 maintains the display state of the transmission-type display panel 42 to the first display state, and moves onto Step S112 without performing light emission of the focus detection region.

In the aforementioned Step S111, the finder display controller 134 has returned the display state of the transmission-type display panel 42 to the first display state at the timing when the LED 68 ends the illumination of the transmission-type display panel 42. However, the present invention is not limited to this configuration. It is also possible that the finder display controller 134 returns the display state of the transmission-type display panel 42 to the first display state, at a predetermined timing after the LED 68 ended the illumination of the transmission-type display panel 42 (e.g., at the timing when 3 seconds has elapsed after the illumination ending). Still alternatively, it may be possible that the finder display controller 134 returns the display state of the transmission-type display panel 42 to the first display state, at the ending of the image capturing processing of Step S113.

Note that the above-described flow was for the DX size selected as the image capturing range. When the FX size has been selected as the image capturing range, the finder display controller 134 does not display the outer region or the circumference frame region, as shown in FIG. 4A. Instead, the finder display controller 134 turns ON the display region corresponding to the focus detection region, when the SW1 is turned ON and that AF control of the camera system controller 55 has determined the focus detection region having obtained focus. Then, the camera system controller 55 controls the LED 68 to perform illumination, and causes the focus detection region to emit light.

In the aforementioned embodiment, the finder display controller 134 fixed the display state of the transmission-type display panel 42 to the second display state, when continuous AF control is executed. However, the present invention is not limited to this example. It is also possible that the finder display controller 134 may fix the display state of the transmission-type display panel 42 to the first display state as well as prohibiting illumination by the LED 68, when continuous AF control is executed.

In the aforementioned embodiment, the image capturing range was selected from the FX size and the DX size. However, the present invention is not limited to this configuration. It is also possible to configure such that a user can designate any pixel range in the effective pixel region of the image capturing element 52, as the aforementioned image capturing range. For example, as the aforementioned image capturing range, the camera system controller 55 may receive a trimming range associated with the effective image capturing range of the FX size, from a user through the operation detecting section 135. In another example, it is possible that the camera system controller 55 receives an aspect ratio different from the aspect ratio 3:2 of the FX size, from a user through the operation detecting section 135, and determines the image capturing range corresponding to this aspect ratio.

In the aforementioned embodiment, the finder display controller 134 has turned the display state of the transmission-type display panel 42 while it is not illuminated by the LED 68, to the first display state in which the outer region of the effective image capturing region is displayed as the first region so as to lower the transmission ratio of the subject optical image in the outer region. Then, the finder display controller 134 has changed the display state of the transmission-type display panel 42 while it is illuminated by the LED 68, from the first display state to the second display state in which the circumference frame region is displayed as the second region so as to lower the transmission ratio of the subject optical image in the circumference frame region, where the circumference frame region is a part of the outer region and includes the circumference of the effective image capturing range. However, the display embodiment of the first display state and the second display state is not limited to as described above.

In another example, it is possible that the finder display controller 134 displays, as the first display state, the first region so as to lower the transmission ratio of the subject optical image in the first region that is at least a part of the outer region of the effective image capturing range, and displays, as the second display state, the second region so as to lower the transmission ratio of the subject optical image in the second region that is a part of the outer region and is smaller in area than the first region. By configuring the display embodiment of the first display state and the second display state in this way, a user can easily recognize the focused region and the image capturing enabled range regardless of whether the LED 68 is conducting illumination or not. Further modification examples of the display embodiments of the first display state and the second display state are elaborated later.

Figure 8A:
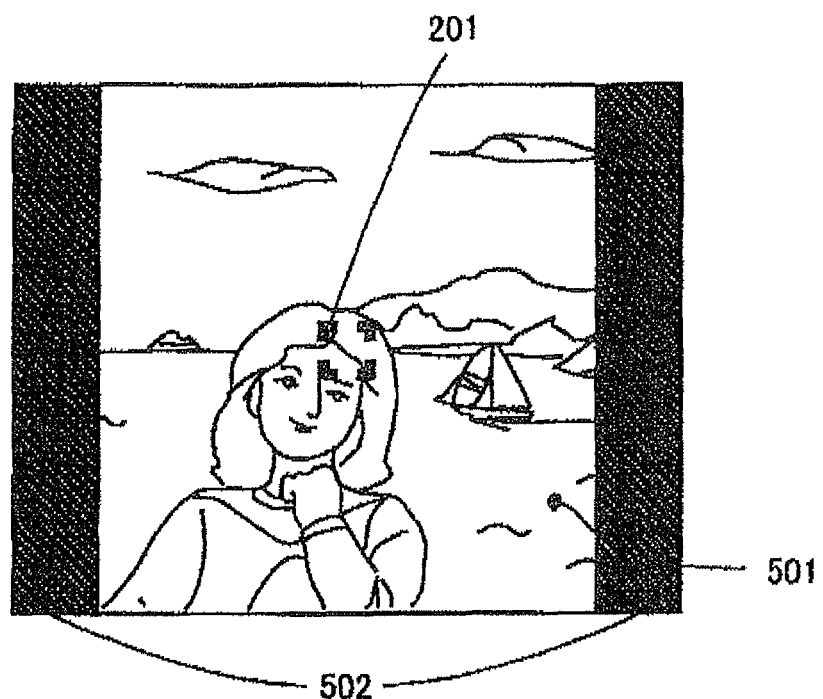
FIG. 8A and FIG. 8B explain a third modification example of the display control processing of the transmission-type display panel.
Figure 8B:
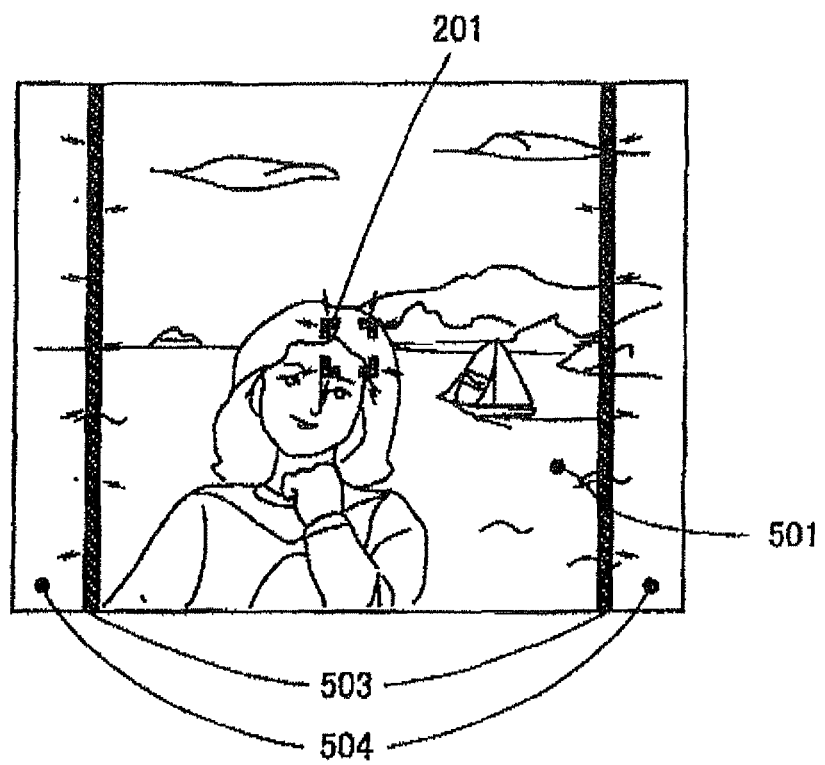

FIG. 8A and FIG. 8B explain a third modification example of the display control process of the transmission-type display panel. The third modification example explains the display control processing in a case in which a user has designated the aspect ratio 1:1, which is slightly longer in the longitudinal side than the FX size having the aspect ratio of 3:2. Note that the image capturing range corresponding to the aspect ratio is determined in advance, and the information about the image capturing range corresponding to the aspect ratio is stored in the camera memory 131.

FIG. 8A is an example of the display of the subject optical image observed through the finder window 45 when the LED 68 is not conducting illumination, in the third modification example. In other words, FIG. 8A is an example of the display in the first display state of the third modification example. Just as in the aforementioned embodiments, the finder display controller 134 turns ON the display region corresponding to the focus detection region 201 representing the region focused on by AF control. In addition, the finder display controller 134 turns ON the display region corresponding to the entire outer region 502 of the effective image capturing range 501 which corresponds to the range of the subject optical image at the aspect ratio of 1:1. In other words, the finder display controller 134 displays the entire outer region 502 as the first region.

As shown in FIG. 5A, the center of the effective image capturing range 501 is determined to coincide with the center of the effective image capturing range of the FX size, i.e., the center of the range of the subject optical image observed through the finder window 45. The width in the longitudinal direction of the effective image capturing range 501 (i.e. the width in the up and down direction of the drawing) is determined to coincide with the width in the longitudinal direction of the effective image capturing range of the FX size (i.e., the width in the longitudinal direction of the range of the subject optical image observed through the finder window 45). Therefore, the outer region 502 is formed as a pair of regions opposing each other sandwiching the effective image capturing range 501 therebetween, in the lateral direction (i.e., in the left and right direction of the drawing).

FIG. 8B is an example of the display of the subject optical image observed through the finder window 45 when the LED 68 is conducting illumination, in the third modification example. In other words, FIG. 5B is an example of the display in the second display state of the third modification example. The finder display controller 134 turns ON the display region corresponding to a side region 503 which is a part of the outer region 502 and includes a pair of sides of the effective image capturing range 501, instead of the entire outer region 502. In other words, the finder display controller 134 displays the side region 503 as the second region. Note that after ending AF control of the camera system controller 55, the finder display controller 134 maintains the display of the focus detection region 201 showing the region focused on by AF control even after the display state has been switched to another.

The transmission ratio of the subject optical image in the side region 503 is lowered, and the side region 503 is recognized darker than the subject optical image in the effective image capturing range 501. On the other hand, the display region corresponding to the other regions 504 of the outer region 502 other than the side region 503 is turned OFF. Therefore, the transmission ratio of the subject optical image in the other regions 504 becomes equivalent to the transmission ratio of the subject optical image in the effective image capturing range 501. By changing the display state of the transmission-type display panel 42 depending on whether the LED 68 is performing illumination or not, a user can easily recognize the focused region and the image capturing enabled range in either case.

Figure 9A:
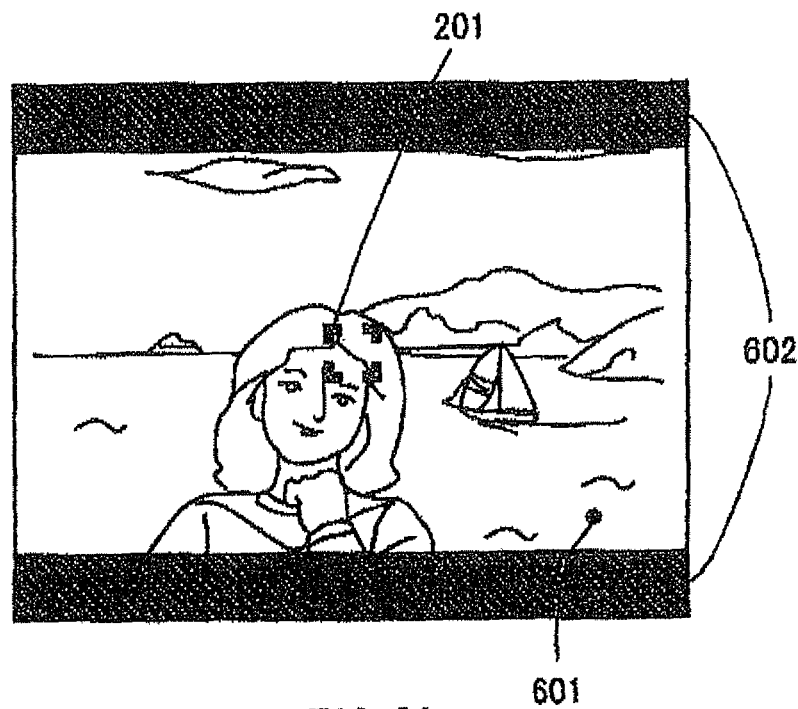
FIG. 9A and FIG. 9B explain a fourth modification example of the display control processing of the transmission-type display panel.
Figure 9B:
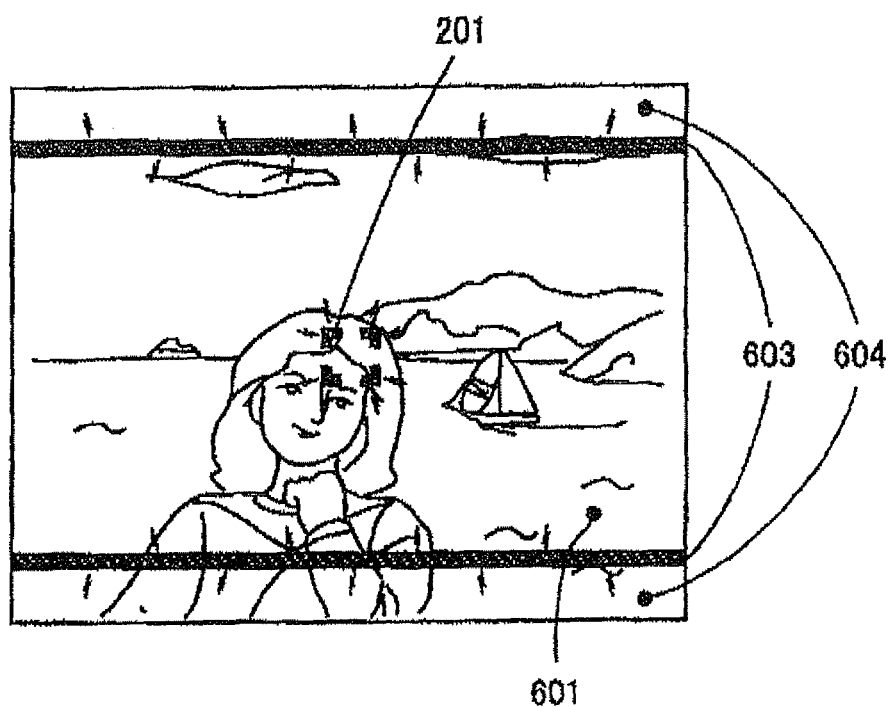

FIG. 9A and FIG. 9B explain a fourth modification example of the display control processing of the transmission-type display panel. The fourth modification example explains the display control processing in a case in which a user has designated the aspect ratio 16:9, which is slightly longer in the lateral side than the FX size having the aspect ratio of 3:2. Note that the image capturing range corresponding to the aspect ratio is determined in advance, and the information about the image capturing range corresponding to the aspect ratio is recorded in the camera memory 131, just as in the third modification example.

FIG. 9A is an example of the display of the subject optical image observed through the finder window 45 when the LED 68 is not conducting illumination, in the fourth modification example. In other words, FIG. 9A is an example of the display in the first display state of the fourth modification example. Just as in the aforementioned embodiments, the finder display controller 134 turns ON the display region corresponding to the focus detection region 201 representing the region focused on by AF control. In addition, the finder display controller 134 turns ON the display region corresponding to the entire outer region 602 of the effective image capturing range 601 which corresponds to the range of the subject optical image at the aspect ratio of 16:9. In other words, the finder display controller 134 displays the entire outer region 602 as the first region.

As shown in FIG. 9A, the center of the effective image capturing range 601 is determined to coincide with the center of the effective image capturing range of the FX size, i.e., the center of the range of the subject optical image observed through the finder window 45. The width in the lateral direction of the effective image capturing range 601 (i.e. the width in the right and left direction of the drawing) is determined to coincide with the width in the lateral direction of the effective image capturing range of the FX size (i.e., the width in the lateral direction of the range of the subject optical image observed through the finder window 45). Therefore, the outer region 602 is formed as a pair of region opposing each other sandwiching the effective image capturing range 601 therebetween, in the longitudinal direction (i.e., in the up and down direction of the drawing).

FIG. 9B is an example of the display of the subject optical image observed through the finder window 45 when the LED 68 is conducting illumination. In other words, FIG. 9B is an example of the display in the second display state of the fourth modification example. The finder display controller 134 turns ON the display region corresponding to a side region 603 which is a part of the outer region 602 and includes a pair of sides of the effective image capturing range 601, instead of the entire outer region 602. In other words, the finder display controller 134 displays the side region 603 as the second region. Note that after ending AF control of the camera system controller 55, the finder display controller 134 maintains the display of the focus detection region 201 showing the region focused on by AF control even after the display state has been switched to another.

The transmission ratio of the subject optical image in the side region 603 is lowered, and the side region 603 is recognized darker than the subject optical image in the effective image capturing range 601. On the other hand, the display region corresponding to the other regions 604 of the outer region 602 other than the side region 603 is turned OFF. Therefore, the transmission ratio of the subject optical image in the other regions 604 becomes equivalent to the transmission ratio of the subject optical image in the effective image capturing range 601. By changing the display state of the transmission-type display panel 42 depending on whether the LED 68 is performing illumination or not, a user can easily recognize the focused region and the image capturing enabled range in either case.

Figure 10A:
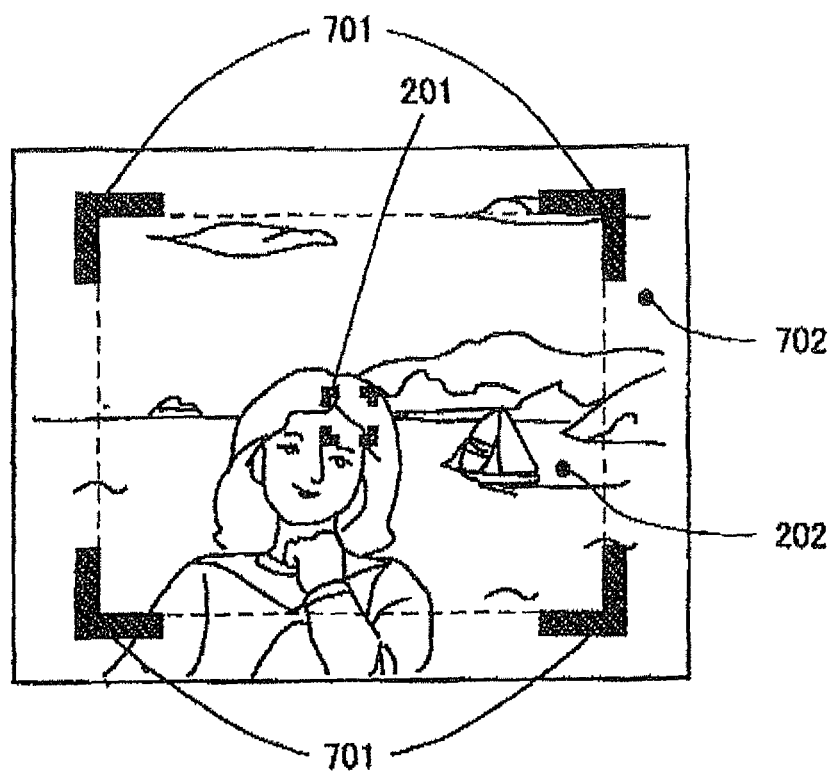
FIG. 10A and FIG. 10B explain a modification example of the display embodiment of the second display state.
Figure 10B:
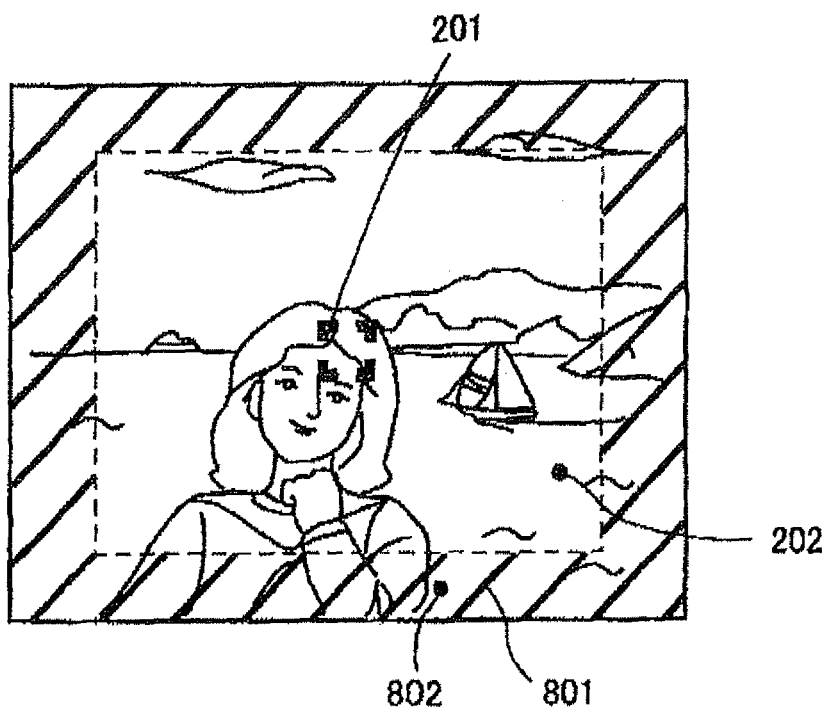

The following explains different display embodiments of the second display state. FIG. 10A and FIG. 10B explain a modification example of the display embodiment of the second display state. Note that the first display state is assumed to be the display state explained with use of FIG. 4B, i.e., the state in which the display region corresponding to the entire outer region 203 that is outside the focus detection region 201 and the effective image capturing range 202 is turned ON.

FIG. 10A is a first modification example of the display embodiment of the second display state. When the LED 68 performs illumination, the finder display controller 134 sets ON the display region corresponding to a corner region 701 that is a part of the outer region 203 which includes four corners on the circumference of the effective image capturing range 202, instead of the entire outer region 203. In other words, the finder display controller 134 displays the corner region 701 as the second region. Note that after ending AF control of the camera system controller 55, the finder display controller 134 maintains the display of the focus detection region 201 showing the region focused on by AF control even after the display state has been switched to another.

The transmission ratio of the subject optical image in the corner region 701 is lowered, and the corner region 701 is recognized darker than the subject optical image in the effective image capturing range 202. On the other hand, the display region corresponding to the other region 702 of the outer region 203 other than the corner region 701 is turned OFF. Therefore, the transmission ratio of the subject optical image in the other region 702 becomes equivalent to the transmission ratio of the subject optical image in the effective image capturing range 202. The circumference frame region explained with reference to FIG. 4 includes this corner region.

In the aforementioned example, the corner region corresponding to all the corners of the circumference of the effective image capturing range 202 was used. However, the present invention is not limited to such a configuration. It is also possible to use a plurality of corner regions respectively containing a plurality of corners determined in advance from among all the corners of the effective image capturing range 202 to enable a user to recognize the effective image capturing range 202. For example, the finder display controller 134 may set ON the display region corresponding to two corner regions 701 including two corners positioned on a single diagonal line of the circumference of the effective image capturing range 202.

In addition, instead of or in addition to the plurality of corner regions 701, a partial side region being a part of the outer region as well as containing a part of the sides constituting the circumference of the effective image capturing region 202 may be used. The partial side region is provided to correspond to each pair of sides constituting the circumference of the effective image capturing range 202, for example. It is also possible to provide the partial side region for each side constituting the circumference of the effective image capturing range 202.

FIG. 10B is a second modification example of the display embodiment of the second display state. When the LED 68 performs illumination, the finder display controller 134 sets ON the display regions corresponding to a plurality of lines 801 drawn through the entire outer region 203, instead of the display region corresponding to the entire outer region 203. In other words, the finder display controller 134 may display, as the second region, the plurality of lines 801 drawn through the entire outer region 203. The plurality of lines 801 are arranged to surround the effective image capturing range 202. Note that after ending AF control of the camera system controller 55, the finder display controller 134 maintains the display of the focus detection region 201 showing the region focused on by AF control even after the display state has been switched to another.

The transmission ratio of the subject optical image in the plurality of lines 801 is lowered, and the plurality of lines 801 are recognized darker than the subject optical image in the effective image capturing range 202. On the other hand, the display region corresponding to the other regions 802 of the outer region 203 other than where the plurality of lines 801 are is turned OFF. Therefore, the transmission ratio of the subject optical image in the other regions 802 becomes equivalent to the transmission ratio of the subject optical image in the effective image capturing range 202.

Note that in the aforementioned example, the finder display controller 134 has defined the entire outer region 203 by the plurality of lines 801. However, only a part of the outer region 203 may be defined by the plurality of lines 801. In such an example, the finder display controller 134 may define the circumference frame region 204 explained with reference to FIG. 4C using the plurality of lines 801. In an example in which the outer region is the outer region 502 explained with reference to FIG. 8A and FIG. 8B, the finder display controller 134 may define the side region 503 explained with reference to FIG. 8B using the plurality of lines 801. In another example in which the outer region is the outer region 602 explained with reference to FIG. 9A and FIG. 9I, the finder display controller 134 may define the side region 603 explained with reference to FIG. 9B using the plurality of lines 801.

The finder display controller 134 may also turn ON the display regions corresponding to a plurality of dots displayed in all or part of the outer region 203. In other words, the finder display controller 134 may display, as the second region, a plurality of dots drawn through all or part of the outer region 203. For example, the plurality of dots are drawn to surround the effective image capturing range 202.

In the aforementioned embodiment, the first display state was defined to be the state in which the display region corresponding to the entire outer region is set ON. However, not limited to such a configuration, the first display state may be defined to be the state in which the display region corresponding to a part of the outer region is set ON, in the present invention.

Figure 11A:
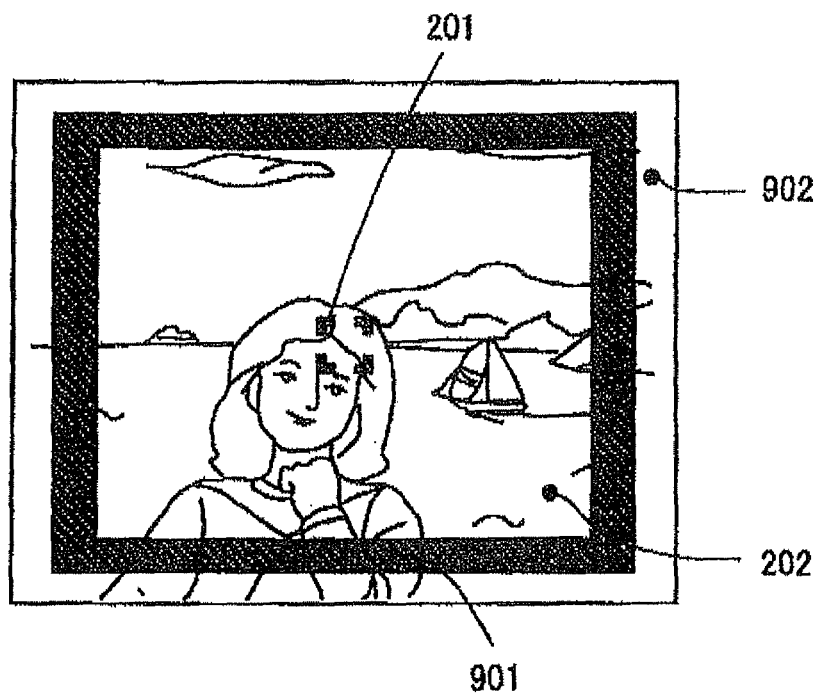
FIG. 11A and FIG. 11B explain a fifth modification example of the display control processing of the transmission-type display panel.
Figure 11B:
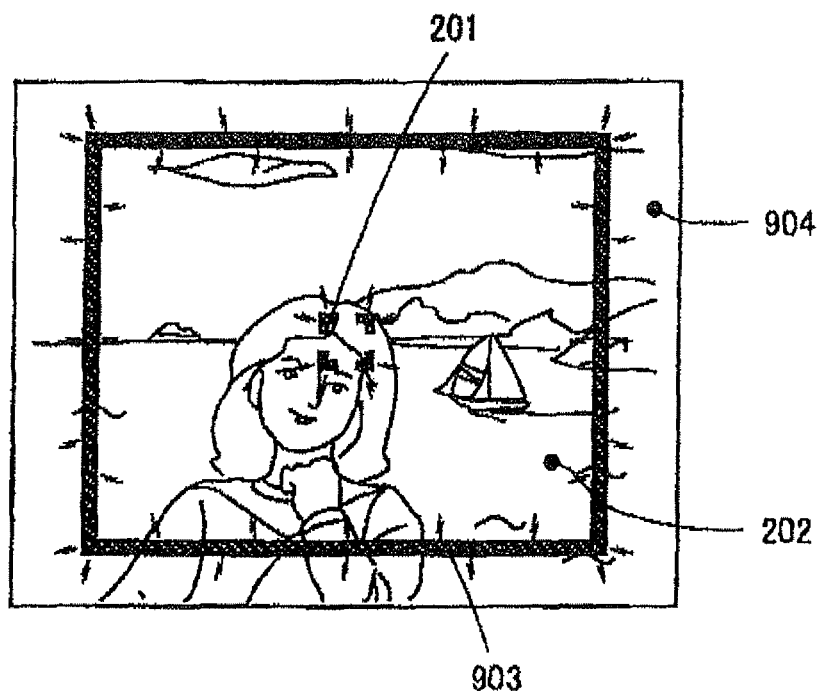

FIG. 11A and FIG. 11B explain a fifth modification example of the display control processing of the transmission-type display panel. The fifth modification example deals with a case in which when the outer region is the outer region 203 explained with reference to FIG. 4A and FIG. 4B, the first display state is defined to be the state in which the display region corresponding to the first circumference frame region that is a part of the outer region 203 and includes the circumference of the effective image capturing range 202 is turned ON. In addition, the second display state is defined to be the state in which the display region corresponding to the second circumference frame region that is a part of the outer region 203, that contains the circumference of the effective image capturing region 202, and that is smaller in area than the first circumference frame region is set ON.

FIG. 11A is an example of the display of the subject optical image observed through the finder window 45 when the LED 68 is not conducting illumination, in the fifth modification example. In other words, FIG. 11A is an example of the display in the first display state of the fifth modification example. Just as in the aforementioned embodiments, the finder display controller 134 turns ON the display region corresponding to the focus detection region 201 representing the region focused on by AF control. In addition, the tinder display controller 134 turns ON the display region corresponding to the first circumference frame region 901 that is a part of the outer region 203 and includes the circumference of the effective image capturing range 202. In other words, the finder display controller 134 displays the first circumference frame region 901 as the first region.

The transmission ratio of the subject optical image in the first circumference frame region 901 is lowered, and the first circumference frame region 901 is recognized darker than the subject optical image in the effective image capturing range 202. On the other hand, the display region corresponding to a first outside-frame region 902 of the outer region 203 which is an area other than the first circumference frame region 901 is turned OFF. Therefore, the transmission ratio of the subject optical image in the first outside-frame region 902 becomes equivalent to the transmission ratio of the subject optical image in the effective image capturing range 202.

FIG. 11B is an example of the display of the subject optical image observed through the finder-window 45 when the LED 68 is conducting illumination, in the fifth modification example. In other words, FIG. 11B is an example of the display in the second display state of the fifth modification example. The finder display controller 134 turns ON the display region corresponding to the second circumference frame region 903 that is a part of the outer region 203, that contains the circumference of the effective image capturing region 202, and that is smaller in area than the first circumference frame region 901. In other words, the finder display controller 134 displays the second circumference frame region as the second region. Note that after ending AF control of the camera system controller 55, the finder display controller 134 maintains the display of the focus detection region 201 showing the region focused on by AF control even after the display state has been switched to another.

The transmission ratio of the subject optical image in the second circumference frame region 903 is lowered, and the second circumference frame region 903 is recognized darker than the subject optical image in the effective image capturing range 202. On the other hand, the display region corresponding to the second outside-frame region 904 of the outer region 203 which is an area outside the second circumference frame region 903 is turned OFF. Therefore, the transmission ratio of the subject optical image in the second outside-frame region 904 becomes equivalent to the transmission ratio of the subject optical image in the effective image capturing range 202. By changing the display state of the transmission-type display panel 42 depending on whether the LED 68 is performing illumination or not, a user can easily recognize the focused region and the image capturing enabled range in either case. Note that the configuration in which the first circumference frame region 901 is constituted by the entire outer region 203 will correspond to the embodiment explained with reference to FIG. 4A, FIG. 4B, and FIG. 4C.

Figure 12A:
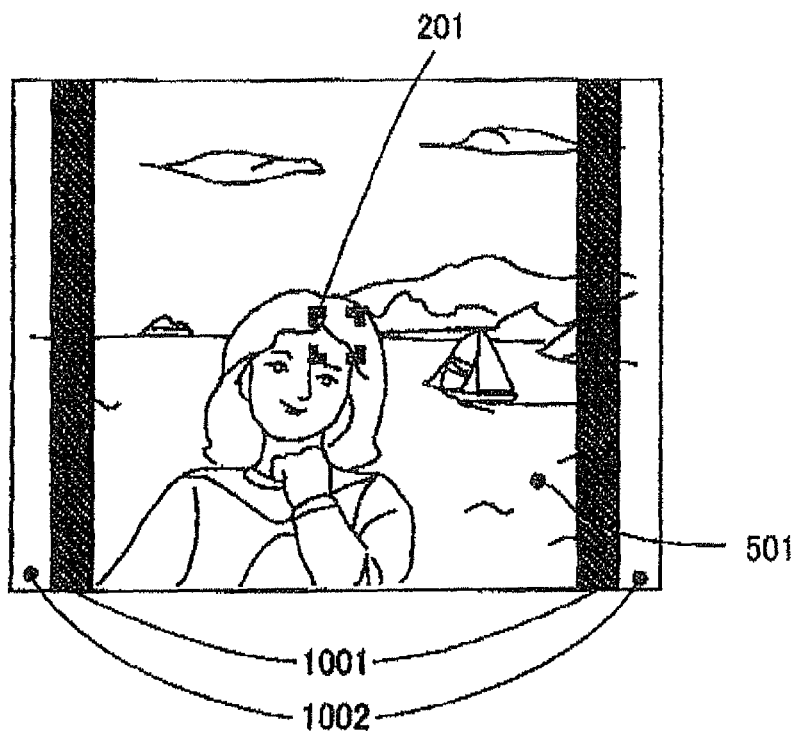
FIG. 12A and FIG. 12B explain a sixth modification example of the display control processing of the transmission-type display panel.
Figure 12B:
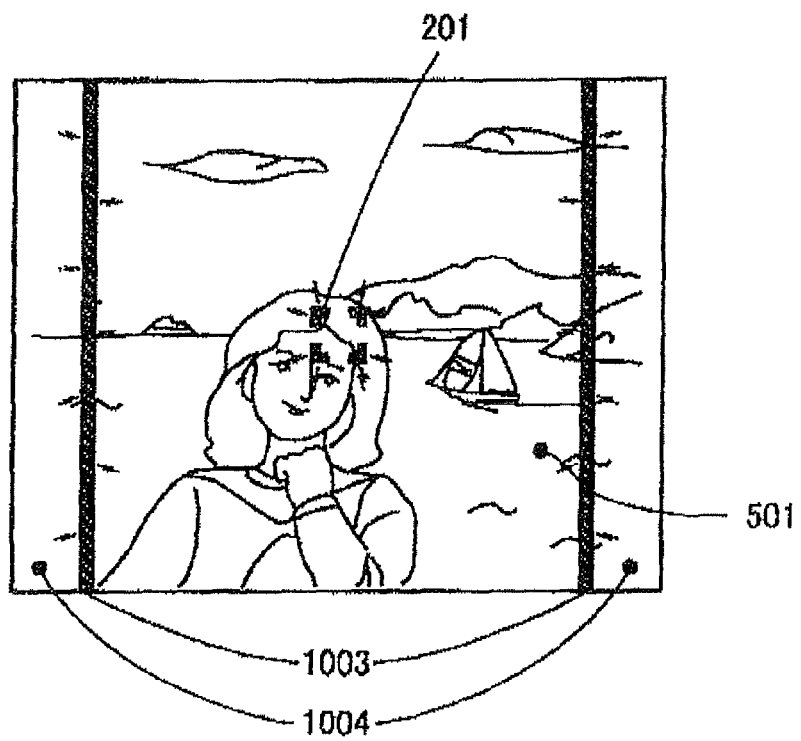

FIG. 12A and FIG. 12B explain a sixth modification example of the display control processing of the transmission-type display panel. The sixth modification example deals with a case in which when the outer region is the outer region 502 explained with reference to FIG. 8A and FIG. 8B, the first display state is defined to be the state in which the display region corresponding to the first side region that is a part of the outer region 502 and includes a pair of sides of the effective image capturing range 501 is turned ON. In addition, the second display state is defined to be the state in which the display region corresponding to the second side region that is a part of the outer region 502, that contains a pair of sides of the effective image capturing range 501, and that is smaller in area than the first side region is set ON.

FIG. 12A is an example of the display of the subject optical image observed through the finder window 45 when the LED 68 is not conducting illumination, in the sixth modification example. In other words, FIG. 12A is an example of the display in the first display state of the sixth modification example. Just as in the aforementioned embodiments, the finder display controller 134 turns ON the display region corresponding to the focus detection region 201 representing the region focused on by AF control. In addition, the finder display controller 134 turns ON the display region corresponding to the first side region 1001 that is a part of the outer region 502 and includes a pair of sides of the effective image capturing range 501. In other words, the finder display controller 134 displays the first side region 1001 as the first region.

The transmission ratio of the subject optical image in the first side region 1001 is lowered, and the first side region 1001 is recognized darker than the subject optical image in the effective image capturing range 501. On the other hand, the display region corresponding to a first outside region 1002 of the outer region 502 which is an area other than the first side region 1001 is turned OFF. Therefore, the transmission ratio of the subject optical image in the first outside region 1002 becomes equivalent to the transmission ratio or the subject optical image in the effective image capturing range 501.

FIG. 12B is an example of the display of the subject optical image observed through the finder window 45 when the LED 68 is conducting illumination, in the sixth modification example. In other words, FIG. 12B is an example of the display in the second display state of the sixth modification example. The finder display controller 134 turns ON the display region corresponding to the second side region 1003 that is a part of the outer region 502, that contains the circumference of the effective image capturing region 501, and that is smaller in area than the first side region 1001. In other words, the finder display controller 134 displays the second side region 1003 as the second region. Note that after ending AF control of the camera system controller 55, the finder display controller 134 maintains the display of the focus detection region 201 showing the region focused on by AF control even after the display state has been switched to another.

The transmission ratio of the subject optical image in the second side region 1003 is lowered, and the second side region 1003 is recognized darker than the subject optical image in the effective image capturing range 501. On the other hand, the display region corresponding to the second outside region 1004 of the outer region 502 which is an area outside the second side region 1003 is turned OFF. Therefore, the transmission ratio of the subject optical image in the second outside region 1004 becomes equivalent to the transmission ratio of the subject optical image in the effective image capturing range 501. By changing the display state of the transmission-type display panel 42 depending on whether the LED 68 is performing illumination or not, a user can easily recognize the focused region and the image capturing enabled range in either case. Note that the configuration in which the first side region 1001 is constituted by the entire outer region 502 will correspond to the embodiment explained with reference to FIG. 8A and FIG. 8B.

Likewise, in a case in which when the outer region is the outer region 602 explained with reference to FIG. 9A and FIG. 9B, the first display state is defined to be the state in which the display region corresponding to the first side region that is a part of the outer region 602 and includes a pair of sides of the effective image capturing range 601 is turned ON. When the illumination by the LED 68 is not conducted, the finder display controller 134 turns ON the display region corresponding to the first side region. When the illumination by the LED 68 is conducted, the finder display controller 134 changes the state of the transmission-type display panel 42 from the first display state to the second display state, where the second display state is defined to be a state in which the display region corresponding to the second side region that is a part of the outer region 602, that includes a pair of sides of the effective image capturing range 601, and that is smaller in area than the first side region is set ON. Note that the configuration in which the first side region is constituted by the entire outer region 602 will correspond to the embodiment explained with reference to FIG. 9A and FIG. 8B.

In the aforementioned embodiments, the display embodiments of the first display state and the second display state are determined in advance. However, it is also possible to arrange to allow a user to be able to designate the display embodiments of the first display state and the second display state. In such an example, it is possible to arrange so that the backside display controller 133 displays a setting screen of the display embodiments of the first display state and the second display state at the backside display section 56, and the camera system controller 55 receives a user designation through the operation detecting section 135.

In the aforementioned embodiments, an optical finder unit 40 was used. However, it is also possible to apply the concept of the present embodiment to an electronic viewfinder unit. Specifically, a transmission-type display panel is provided between the display apparatus such as a liquid crystal monitor of the electronic viewfinder unit and the finder window, for the purpose of displaying information as overlaid on a subject image displayed on the display apparatus. An LED and a light guide for entering illumination light of the LED to the side surface of the transmission-type display panel are also provided. The transmission-type display panel, the LED, and the light guide play similar functions to the functions of the transmission-type display panel 42, the LED 68, and the light guide 67 described above. Then, the finder display controller controls the display state of the transmission-type display panel depending on whether the LED conducts illumination or not, as stated above.

In the aforementioned embodiment, the entire single-lens reflex camera 10 was explained as an example of the image capturing apparatus. However, the camera body 30 may be considered as the image capturing apparatus. In the aforementioned embodiment, a lens exchangeable camera was taken as an example of the image capturing apparatus. However, the concept of the present embodiment is also applicable to a lens-integrated camera in which the lens optical system sis are integrated.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A finder unit comprising:
   a transmission-type display section that displays information as overlaid on a subject image; and
   a display controller that, when an illuminating section illuminates the display section, changes a first display state to second display state, wherein
   in the first display state, a first region which is at least a part of an outer region of an effective image capturing range is displayed so that a transmission ratio of the subject image in the first region is lowered, and in the second display state, a second region which is a part of the outer region and is smaller in area than the first region is displayed so that a transmission ratio of the subject image in the second region is lowered,
   the display controller continues displaying a focus detection region regardless of whether the illuminating section is conducting illumination or not, and
   when the focus detection region transitions, (i) the display controller prohibits illumination by the illuminating section or (ii) the display controller sets the second display state regardless of whether the illuminating section is conducting illumination or not.

2. The finder unit according to claim 1, wherein
   when changing to the second display state, the display controller prohibits display other than the focus detection section and the second region.

3. The finder unit according to claim 1, wherein
   the first region is a first side region including a pair of sides constituting a circumference of the effective image capturing range.

4. The finder unit according to claim 3, wherein
   the first region is an entirety of the outer region.

5. The finder unit according to claim 3, wherein
the second region is a second side region including a pair of sides constituting a circumference of the effective image capturing range.

6. The finder unit according to claim 1, wherein
the display controller displays the second region by a plurality of lines or a plurality of dots defining the first region.

7. A finder unit comprising:
a transmission-type display section that displays information as overlaid on a subject image; and
a display controller that, when an illuminating section illuminates the display section, changes a first display state to a second display state, wherein
in the first display state, a first region which is at least a part of an outer region of an effective image capturing range is displayed so that a transmission ratio of the subject image in the first region is lowered, and in the second display state, a second region which is a part of the outer region and is smaller in area than the first region is displayed so that a transmission ratio of the subject image in the second region is lowered,
when a light measuring sensor measures light using the subject image, the display controller prohibits illumination by the illuminating section (i) as well as setting the second display state or (ii) as well as prohibiting display by the display section.

8. The finder unit according to claim 7, wherein
the display controller changes to the first display state from the second display state at a timing determined in advance.

9. The finder unit according to claim 8 wherein
the timing is defined to he a timing at which the illuminating section ends illumination of the display section.

10. The finder unit according to claim 7, wherein
the first region is a first circumference frame region including a circumference of the effective image capturing range.

11. The finder unit according to claim 10, wherein
the first region is an entirety of the outer region.

12. The finder unit according to claim 10, wherein
the second region is a corner region including a plurality of corners of a circumference of the effective image capturing range.

13. The finder unit according to claim 12, wherein
the second region is a second circumference frame region including the circumference.

14. The finder unit according to claim 7, further comprising the illuminating section.

15. The finder unit according to claim 7, further comprising:
a focusing screen for forming an image of a subject light flux reflected by a mirror section.

16. An image capturing apparatus comprising the finder unit according to claim 7.

17. A non-transitory computer readable medium storing therein a display control program of a finder unit including a transmission-type display section for displaying information as overlaid on a subject image, the display control program causing a computer to execute operations comprising:
changing a first display state to a second display state when an illuminating section illuminates the display section, wherein
in the first display state, a first region which is at least a part of an outer region of an effective image capturing range is displayed so that a transmission ratio of the subject image in the first region is lowered, and in the second display state, a second region which is a part of the outer region and is smaller in area than the first region is displayed so that a transmission ratio of the subject image in the second region is lowered;
continuing to display a focus detection region regardless of whether the illuminating section is conducting illumination or not; and
when the focus detection region transitions, (i) prohibiting illumination by the illuminating section or (ii) setting the second display state regardless of whether the illuminating section is conducting illumination or not.

18. A non-transitory, computer readable medium storing therein a display control program of a finder unit including a transmission-type display section for displaying information as overlaid on a subject image, the display control program causing a computer to execute operations comprising:
changing a first display state to a second display state hen an illuminating section illuminates the display, section, wherein
in the first display state, a first region which is at least a part of an outer region of an effective image capturing range is displayed so that a transmission ratio of the subject image in the first region is lowered, and in the second display state, a second region which is a part of the outer region and is smaller in area than the first region is displayed so that a transmission ratio of the subject image in the second region is lowered; and
when a light measuring sensor measures light using the subject image prohibiting illumination by the illuminating section (i) as well as setting the second display state or (ii) as well as prohibiting display by the display section.

* * * * *